United States Patent [19]

Takanashi et al.

[11] Patent Number: 4,956,714
[45] Date of Patent: Sep. 11, 1990

[54] IMAGE PICKUP APPARATUS

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka, all of Japan

[73] Assignee: Victor Company of Japan, Ltd., Kanagawa, Japan

[21] Appl. No.: 301,324

[22] Filed: Jan. 24, 1989

Related U.S. Application Data

[63] Continuation-in-part of Ser. No. 139,005, Dec. 29, 1987, Pat. No. 4,831,452.

[30] Foreign Application Priority Data

| Jan. 24, 1988 | [JP] | Japan | 63-13251 |
| Jan. 25, 1988 | [JP] | Japan | 63-13943 |
| Jan. 26, 1988 | [JP] | Japan | 63-15263 |
| Jan. 26, 1988 | [JP] | Japan | 63-15264 |

[51] Int. Cl.$^5$ .................................... H04N 5/30
[52] U.S. Cl. .................. 358/213.11; 358/217
[58] Field of Search ............ 358/213.14, 213.13, 358/209, 217, 213.11

[56] References Cited

U.S. PATENT DOCUMENTS

| 3,255,308 | 6/1966 | Walkup | 178/6.6 |
| 3,352,967 | 11/1967 | Wiley | 178/6.6 |
| 3,577,200 | 5/1971 | Aldrich et al. | 358/213.13 |
| 3,716,747 | 2/1973 | Patel | 358/213.13 |
| 3,723,651 | 3/1973 | Gorog | 178/7.5 D |
| 3,865,975 | 2/1975 | Fletcher et al. | 358/213.14 |
| 4,015,285 | 3/1977 | Romeas | 358/128 |
| 4,641,193 | 2/1987 | Glenn | 358/213.13 |
| 4,727,427 | 7/1988 | Kime | 358/217 |

FOREIGN PATENT DOCUMENTS

| 0164577 | 12/1985 | European Pat. Off. |
| 1203207 | 8/1970 | United Kingdom |
| 1512670 | 6/1978 | United Kingdom |

OTHER PUBLICATIONS

O Plus E, No. 86, Jan. 1, 1987, published by Shingijutsu Communications, Inc., Japan.

Primary Examiner—Stephen Brinich
Attorney, Agent, or Firm—Michael N. Meller

[57] ABSTRACT

An image pickup apparatus comprising: a charge storage member being movable; a photo-charge conversion unit comprising a photoconductive layer member having a transparent electrode, an electrode, and means for applying an electric field between said transparent electrode and said electrode, said photo-charge conversion unit opposing said charge storage member; and means for focussing an optical image of an object through said transparent electrode onto an image focussing surface of said photo-charge conversion unit via a taking lens, and for forming an electric charge image corresponding to said optical image of the object on said charge storage member. The image pickup apparatus may further comprises reading means for reading said electric charge image corresponding to said optical image and generating an electrical signal according to said electric charge image by opposing said charge storage member.

6 Claims, 15 Drawing Sheets

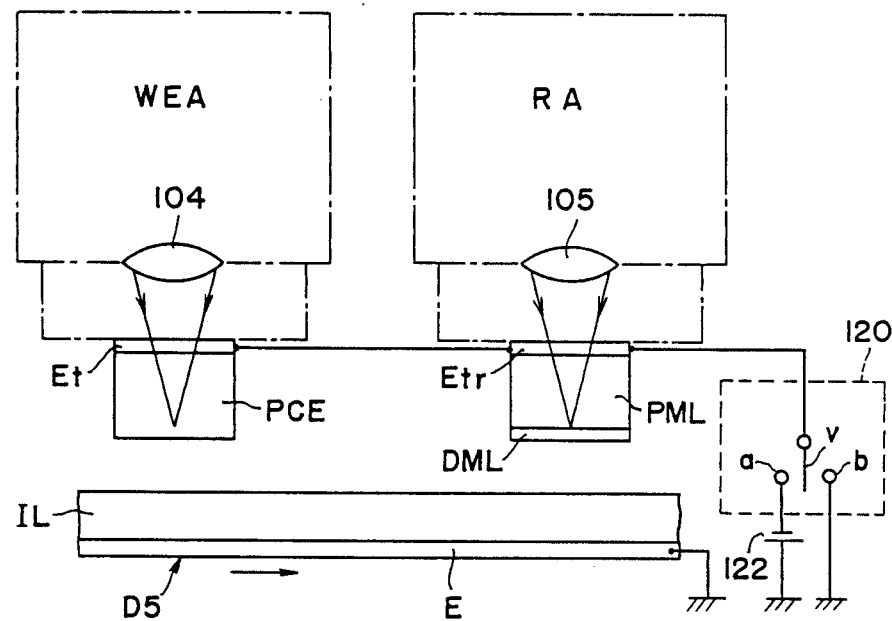
F I G. 11
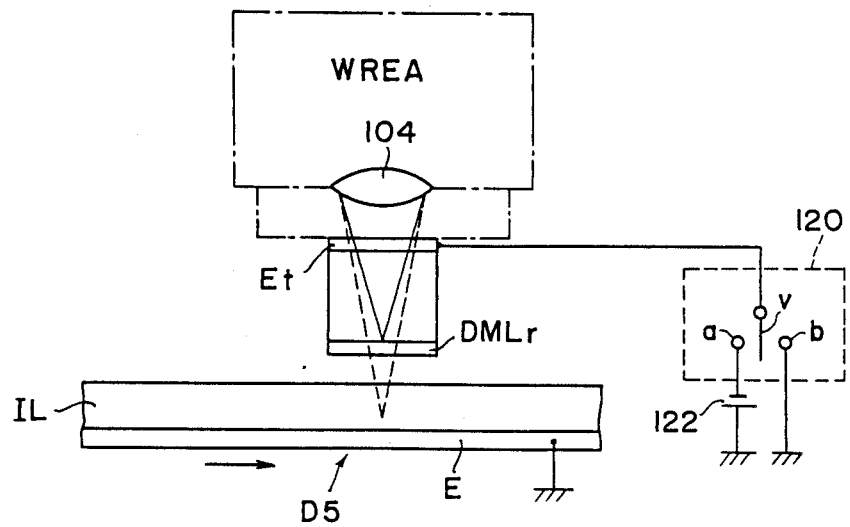
F I G. 12

IMAGE PICKUP APPARATUS

BACKGROUND OF THE INVENTION

The present invention relates to an image pickup apparatus with high resolution capability, particularly with image storage function.

A video signal obtained by picking up an optical image of an object with an image pickup apparatus can be easily processed such as editing, image trimming and the like. Recording/reproducing a video signal can also be easily performed by using an erasable/rewritable memory. With a conventional image pickup apparatus, an optical image of an object is focussed onto a photoconductive region of an image pickup element by a taking lens then converted into electric image information. The electric image information is time sequentially outputted as a video signal. Various image tutes or solid state image pickup elements have been used for such conventional image pickup apparatus.

It is also known that various new television systems such as EDTV, (Extended definition TV) HDTV (High definition TV), and the like have been proposed for recent requirements of high quality and resolution of reproduced images.

In order to reproduce images with high quality and resolution, it is necessary for an image pickup apparatus to generate a video signal from which an image of high quality and resolution can be reproduced. However, an image pickup apparatus using an image tube has a limit in reducing the diameter of an electron beam, and also the target capacitance thereof increases as the target area made large, resulting in a poor resolution. Further, for high resolution moving images, the necessary frequency band for such a video signal should become larger than several tens to hundreds MHz, thus posing a problem of poor S/N. The above problems have made it difficult to obtain reproduced images of high quality and resolution.

More specifically, in order to obtain a video signal from which an image of high quality and resolution can be reproduced, it is necessary to reduce the diameter of an electron beam or make a large target area without causing a capacitance increase. However, there is a limit in reducing the diameter of an electron beam because of the capability of electron gun and the structure of focussing system. If the target area is made large using a large taking lens, the target capacitance becomes inherently large so that the high frequency components of a video signal is degraded and hence the S/N thereof becomes considerably poor. Thus, it is impossible for an image pickup apparatus with an image tube to obtain a video signal for a reproduced image of high quality and resolution.

In the case of an image pickup apparatus with a solid state image pickup element, in order to obtain a video signal from which an image of high quality and resolution can be reproduced, it is necessary to use a solid state image pickup element having a large number of picture elements pixels. However, with the solid state image element having a large number of picture elements, the drive clock frequency becomes high (in the case of moving images, it would be about several hundreds MHz) and the capacitance of the drive circuit becomes large as the number of picture elements increases. The clock frequency currently used for a solid state image pickup element is generally about 20 MHz so that such an image pickup apparatus cannot be realized in practice.

As described above, conventional image pickup apparatus cannot generate a video signal suitable for high resolution and quality of reproduced images.

In the meantime, the image pickup element of a conventional image pickup apparatus has not a long term memory function by itself to store object images, but it merely obtains an electric video signal through photoelectric conversion of optical information in response thereto. Thus, if it is required to store picked-up electric information signals, an additional magnetic storage for example becomes necessary. It has been long desired accordingly to provide an image pickup element having by itself a memory function.

SUMMARY OF THE INVENTION

It is therfore an object of the present invention to provide an image pickup apparatus capable of generating a video signal of high quality and resolution.

It is another object of the invention to provide an image pickup apparatus capable of storing a video signal of high quality and resolution.

It is a further object of the invention to provide a recording/reproducing apparatus capable of reading a video signal of high quality and resolution with high fidelity.

It is a still further object of the invention to provide a display device capable of projecting an image of recorded video signal.

To achieve the above objects, the present invention provides an image pickup apparatus comprising: a photo-charge conversion unit comprising a photoconductive layer member having a transparent electrode, a movable charge storage layer member, an electrode, and means for applying an electric field between said transparent electrode and said electrode; means for focussing an optical image of an object from said transparent electrode onto an image focussing surface of said photo-charge conversion unit via a taking lens, and forming an electric charge image corresponding to said optical image of the object on said charge storage layer member of said photo-charge conversion unit; means for moving said charge storage layer member so that said electric charge image corresponding to said optical image is moved to an electric charge image reading unit; and means for generating a video signal of said charge image by reading with said electric charge image reading unit said electric charge image corresponding to said optical image of the object.

The present invention further provides an image pickup apparatus comprising: means for focussing an optical image of an object via a taking lens onto a photo-photo conversion element which is constructed of at least a photoconductive layer member and a dielectric mirror both interposed between two transparent electrodes; means for reading optical image information corresponding to said optical image of the object from said photo-photo conversion element by using a monowavelength light; and a photo-charge conversion element constructed of at least a photoconductive layer member and a charge storage layer member for recording said optical image of the object read out from said photo-photo conversion element. The present invention further provides an image pickup apparatus comprising: means for focussing an optical image of an object via a taking lens onto a photo-photo conversion element which is constructed of at least a photoconductive layer member and a dielectric mirror both interposed between two transparent electrodes; means for reading optical image information corresponding to said optical image of the object from said photo-photo conversion element by using a mono-wavelength light; a photo-charge conversion element constructed of at least a photoconductive layer member and a charge storage layer member for recording said optical image of the object read out from said photo-photo conversion element; and means for applying said optical image information read from said photo-photo conversion element and a reference light for forming a hologram to said photo-charge conversion element.

The present invention further provides a recording-/reproducing apparatus comprising: a transparent electrode to which a laser beam is applied; a photoconductive layer member into which said laser beam passed through said transparent electrode enters; a recording medium having an electrode and a charge storage layer member, a voltage being applied across said electrode and said transparent electrode to generate an electric field therebetween, and said charge storage layer member holding an electric charge to be generated in correspondence with said electric field; means for changing said electric field in accordance with an information signal to be recorded, and forming on said charge storage layer member an electric charge pattern corresponding to said information signal; and means for reading said electric charge pattern formed on said charge storage layer member of said recording medium based on a potential difference between said electrode and the surface on which said electric charge pattern is formed.

The present invention further provides a display apparatus comprising: a recording medium for storing an information in the form of charge image; a charge image reading head comprising a transparent electrode, a dielectric mirror and a modulation layer interposed therebetween, said dielectric mirror being faced toward said recording medium, and said layer member being made of a material by which causes a light beam, applied to said transparent electrode and reflected by said dielectric mirror and outputted from said transparent electrode, being changed in mode by an electric field generated by said electric charge image on said recording medium; means for applying an information reading light beam to said transparent electrode of said charge image reading head; and means for projecting a light beam outputted from said transparent electrode of said charge image reading head, said light beam having an intensity changed with said charge image.

BRIEF DESCRIPTION OF THE DRAWINGS

In the accompanying drawings:

FIG. 4, and FIGS. 7 to 19 are schematic block diagrams showing the embodiments of the recording/reproducing apparatus of the invention;

DETAILED DESCRIPTION OF THE PREFERRED EMBODIMENTS

Figure 1:
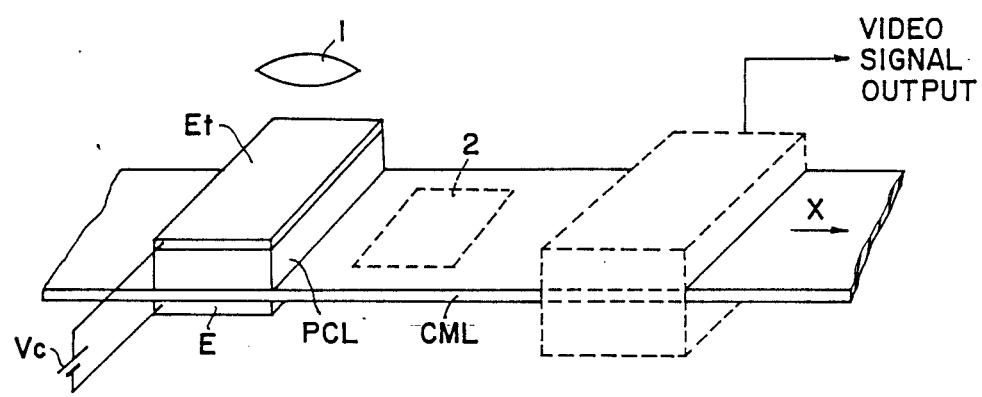
FIG. 1 is a perspective view used for explaining the structure and operation principle of the image pickup apparatus of the present invention.
Figure 2:
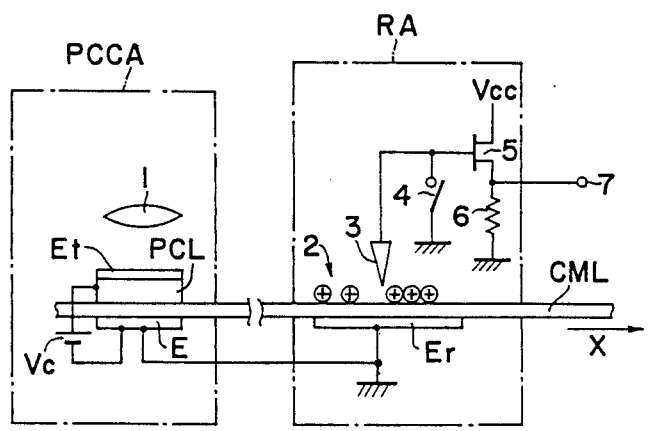
FIGS. 2 and 3 are block diagrams showing the embodiments of the image pickup apparatus of the invention.
Figure 3:
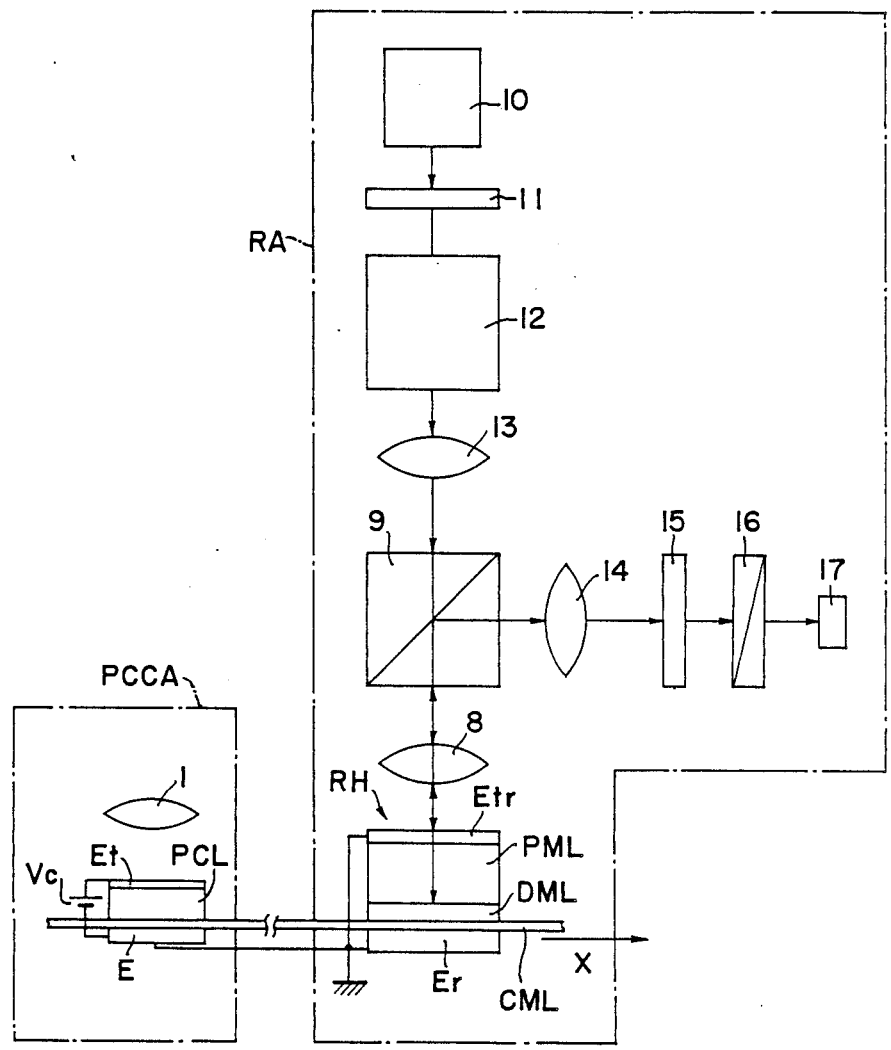

The preferred embodiments of the image pickup apparatus of this invention will be described in detail with reference to the accompanying drawings. FIG. 1 is a perspective view used for explaining the structure and operation principle of the image pickup apparatus of this invention, and FIGS. 2 and 3 schematically show the structure of an embodiment of the image pickup apparatus.

Referring to FIG. 1, a transparent electrode Et, electrode E, photoconductive layer PCL and charge memory layer CML constitute a photo-charge converter unit PCCA. A power supply Vc is connected between the transparent electrode Et and electrode E to generate therebetween a predetermined electric field.

The material of the photoconductive layer PCL may use various inorganic photosensitive materials such as Se, CdS, amorphous Si and the like, and various organic photosensitive materials such as PVK (Polyvinyl Carbozole), phthalocyanine, azo family and the like.

The material of the charge memory layer CML may use silicon resin, polyester and the like.

The photo-charge converter unit PCCA is covered with an appropriate box in order to shield it from undesirable external light.

The transparent electrode (t is made of a material such as ITO (Indium-Titan-Oxide) having a spectral transmission characteristic which allows light information with a particular wavelength band of an object to be passed therethrough. The photoconductive layer PCL is made of a photoconductive material such as amorphous silicon having a characteristic which allows, upon application of a very fine optical image to one end surface of the material under a proper electric field, to generate a corresponding very fine electric charge image (electrostatic image) on the opposite end surface. The charge memory layer CML is made of a material such as silicon resin having a high insulation resistance which allows an electric charge image formed on the surface thereof is maintained as it is for a long period of time.

The charge memory layer CML may be of a disk type, tape type, sheet type, or any other types and is moved in the X-direction indicated by an arrow in the figure at a predetermined speed.

An optical image of an object is focussed on the focal plane of the photo-charge conversion unit PCCA via a taking lens 1 mounted in front of the transparent electrode Et. The photo-charge conversion unit PCCA operates to generate an electric charge image, corresponding to the optical image of an object focussed on the focal plane, on the charge memory layer CML. The conversion operation from an optical image into an electric charge image is performed by the photo-charge conversion array PCCA as in the following.

A light ray applied to the transparent electrode Et from the taking lens 1 passes through the electrode Et and reaches the photoconductive layer PCL. The resistance of the photoconductive layer PCL varies in accordance with the light intensity so that the resistance at each point of the photoconductive layer PCL is proportional to the light intensity at the corresponding point of an object.

Upon application of an electric field by the power supply Vc between the transparent electrode Et and electrode E, an electric charge inverse proportional in amount to the resistance of the photoconductive layer PCL is formed on the charge memory layer CML which opposes the photoconductive layer PCL. Therefore, an electric charge image corresponding to the optical image of an object is formed on the charge memory layer CML. An optical image of an object is applied to the photoconductive layer PCL in one of the following two manners. Namely, the entire image of an object may be applied from the taking lens 1 to the photoconductive layer PCL at a time to generate a two-dimensional electric charge image on the charge memory layer CML at a time, or may be applied sequentially by using a scanner to build up the entire electric charge image sequentially one after another. In both the cases, after the complete charge image has been formed on the end surface of the charge memory layer CML, the charge memory layer CML is slightly spaced apart from the photoconductive layer PCL and moved in the arrow direction to the position where the electric charge image 2 is completely outside of the photoconductive layer PCL, thus enabling the subsequent image pickup operation. When the electric charge image is formed on the charge memory layer CML, the charge memory layer CML may be arranged to contact the photoconductive layer then displaced to detach vertically therefrom before the subsequent lateral movement.

As described above, electric charge images 2 can be formed sequentially on the surface of the charge memory layer CML. The amount of charge at every point of the charge image 2 corresponds to the amount of light from every corresponding point of the object. Therefore, the electric charge image has a resolution as high as that of a very fine optical image applied to the photoconductive layer PCL. Consequently, if the electric charge image is read with a reader having a high resolution, a video signal can be generated from which a very fine image can be reproduced.

The charge memory layer CML of the photo-charge conversion unit PCCA is displaced or transported in the X-direction such that the electric charge image 2 relocates at a reader unit RA whereat the electric charge image 2 corresponding to the optical image of an object is detected electrostatically, optically, or by using other suitable charge detecting means. Thus, a video signal can be readily generated by which a very fine image can be reproduced. The photo-charge conversion unit PCCA and the reader unit RA may be combined to form a single system or independent each other.

For application of the image pickup apparatus of this invention to a color image pickup apparatus, an image of an object is picked up for each of the three primary colors by using a well known three-color separation optical system. In embodying the present invention, the charge memory layer CML may be mounted slightly spaced apart from the photoconductive layer PCL. In this case, an electric charge image corresponding to the optical image of an object is formed through discharge between the surfaces of the charge memory layer CML and photoconductive layer PCL.

The amount of charge at every point of the electric charge image 2 on the charge memory layer CML is read by the reader unit RA which in the embodiment shown in FIG. 2 reads the charge electrostatically, and in the embodiment shown in FIG. 3 reads it optically.

First, the reader unit RA shown in FIG. 2 will be described. In FIG. 2, the reader unit RA is constructed of a charge detecting needle electrode 3, switch 4, field effect transistor 5, resistor 6 and output terminal 7. In the reader unit RA, the needle array 3 mounted close to the electric charge image 2 on the charge memory layer CML detects the charge through electrostatic induction at high resolution. The detected charge is applied to the gate of the field effect transistor 5 and the voltage across the resistor 6 connected between the source and ground is supplied to the output terminal as a detected value. The switch 4 is a reset switch for discharging unnecessary charge stored in the gate because of leakage of the field effect transistor 5. The switch 4 may be a field effect transistor or the like in practical use.

Although the needle electrode 3 has been shown as a single needle in FIG. 2, it may be a multi-needle electrode constructed of a linear array of a plurality of needles. In the latter, a two-dimensional mechanical scanner necessary for the single needle electrode is not needed, and the two-dimensional charge reading operation can be performed by using a one-dimensional scanner movable only in a sub-scan direction.

If the multi-needle electrode constructed of an array of a plurality of needles is used, a mechanical scanner becomes unnecessary. Precision made plural needles can be readily realized by an LSI process technique.

Next, the reader unit RA shown in FIG. 3 will be described. In FIG. 3, an electrode Er contacts the surface of the charge memory layer CML opposite to the surface on which an electric charge image 2 is formed. A dielectric mirror DML of a charge image reading head RH is positioned facing the electrode Er, with the charge memory layer CML interposed therebetween.

The charge image reading head RH converts the electric charge image into an optical image, and is constructed of the dielectric mirror DML, photo-modulation layer PML, and transparent electrode Etr laminated in this order. The photo-modulation layer PML is made of a material such as lithium niobate having an electro-optical effect, or a nematic liquid crystal having an electric field scattering effect, the material changing (modulating) the optical characteristic on mode of light inputted thereto in accordance with a voltage applied thereto or electric potential developed therein.

With an electric charge image applied to the dielectric mirror DML and upon input of light to the photo-modulation layer PML, the light passes the photo-modulation layer PML and is reflected by the dielectric mirror DML to pass through again a body of the photo-modulation layer PML. In this case, the optical characteristics or mode (polarization angle, in the case of the above-described material) of input and output lights vary with the charge quantity of an electric charge image thus a light modulation takes place.

Specifically, a light beam radiated from a laser light source 10 (or a halogen lamp 10) is applied to a light polarizer 11 to make it a linearly polarized light which is applied to a light polarizer 12. If the light source 10 is a linearly polarized laser light source, then the light polarizer 11 is not needed.

The light deflector 12 transforms the inputted beam of light into a deflected light beam in two perpendicular directions such as a television raster to produce a quasi-multi beam light.

The light outputted from the deflector 12 is applied to a collimator lens 13 to make the multiple beams parallel each other which are then applied to a beam splitter 9.

The light from the beam splitter 9 passes through a lens 8 and is applied to the charge image reading head RH. Since the electric charge image is being applied from the charge memory layer CML to the dielectric mirror DML, an electric field is being applied to the photo-modulation layer PML.

In this condition, upon application of a light to the transparent electrode Etr of the charge image reading head RH, the incident light passes through the photo-modulation layer PML, and is reflected by the dielectric mirror DML and returned to the photo-modulation layer PML then proceed to the lens 8 through the transparent electrode Etr. As the optical characteristics (polarization angle in the case of the above-described material) of the photo-modulation layer PML changes in accordance with the amount of charge at each point of the electric charge image in the charge memory layer CML, the output light when returned from the charge image reading head RH after passing through the photo-modulation layer PML is undergone its polarization plane being rotated or modulated by the amount corresponding to the amount of charge of the charge image.

The output light from the charge image reading head RH is applied to a converging lens 14 via the lens 8 and beam splitter 9 so that multiple beams are converged upon a same focal point.

The light from the converging lens 14 is applied to a wave plate 15 for providing an optical bias to the modulated polarization plane then supplied to an analyzer 16 so that the analyzer 16 transforms a linear portion of the modulated polarization plane into a linear change of intensity. The light from the analyzer is applied to a photoelectric converter 17 positioned at the focal point of the converging lens 14 so that a video signal can be obtained whose amplitude is modulated in accordance with the amount of charge at every point of the two-dimensional electric charge image on the charge memory layer CML.

As described above, the video signal outputted from the photoelectric converter 17 corresponds in amplitude to the charge distribution of the very fine two-dimensional charge image on the charge memory layer CML. Therefore, if a laser beam having a diameter of 1 micron for example is used for reading the charge image, then a video signal having a high resolution of 1000 lines/mm can be generated.

The image pickup apparatus of this invention can be used in picking up and recording optical information of not only an ordinary optical image but also other images such as characters, figures, patterns, coded optical information and the like. Further, the charge images sequentially formed on the surface of the charge memory layer each have a corresponding amount of charge to the intensity of light of an object applied to the photoconductive layer so that each charge image has the same high resolution as that of a very fine optical image of an object. Thus, it is possible to readily obtain a video image of high fidelity by electrostatically or optically reading the charge image. Optical information of an object can be picked up and recorded by the image pickup apparatus of this invention.

According to the image pickup apparatus of this invention, the photo-charge conversion unit PCCA picks up and records optical information of not only an ordinary optical image but also of other images such as characters, figures, patterns, coded optical information and the like, in the form of charge images sequentially formed on the surface of the charge memory layer. The charge images on the surface of the charge memory layer CML are read by the reading unit RA to obtain video signals. The reading unit may be mounted adjacent to the photo-charge conversion unit PCCA as shown in FIG. 1, or may be located separately therefrom as shown in FIGS. 2 and 3. Therefore, the present invention is applicable to electronic still cameras, camera-built-in recording/reproducing apparatus and the like.

If the photo charge conversion unit PCCA and charge image reading unit RA are constructed independent each other, the charge memory layer CML with charge images formed thereon is removed from the photo-charge conversion unit PCCA in the similar manner as of ordinary electronic still cameras, camera-built-in recording/reproducing apparatus and the like. The charge images on the removed charge memory layer are then read with the discrete reading unit RA to generate video signals.

Figure 4:
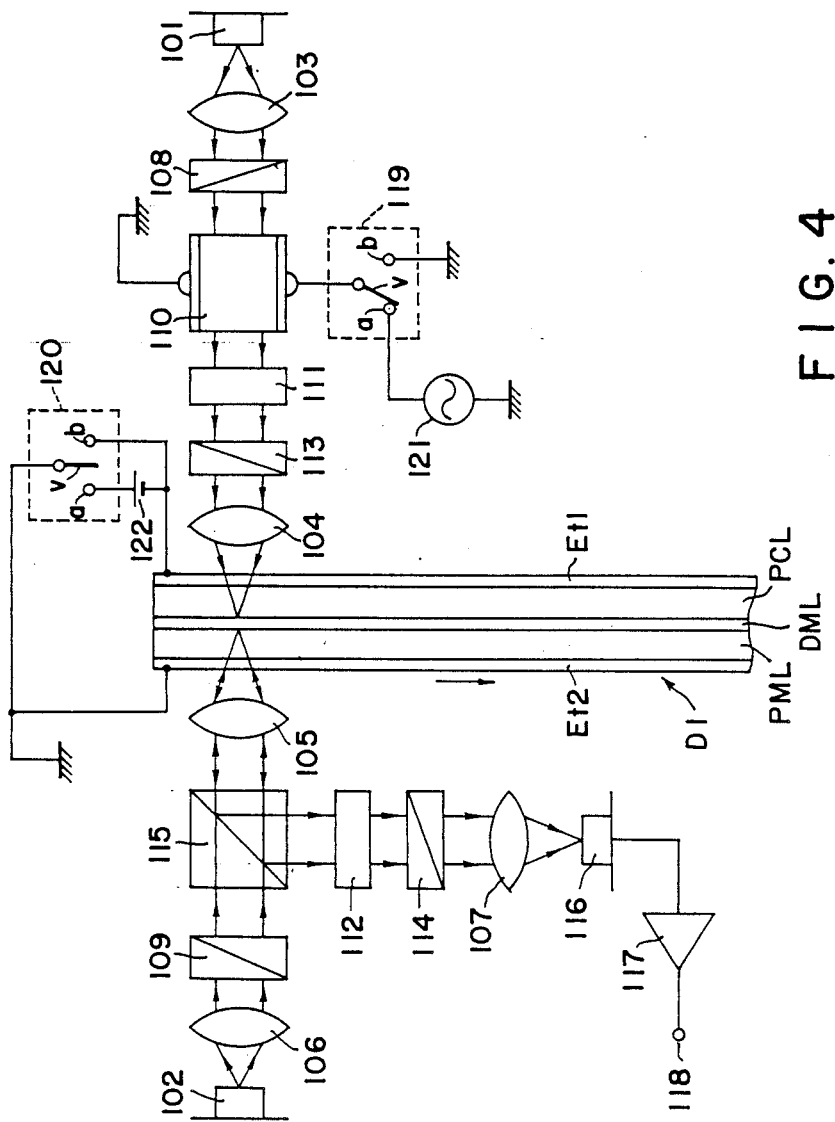

FIG. 4 is a block diagram showing an embodiment of a recording/reproducing apparatus of this invention. In FIG. 4, a recording medium disk D1 (hereinafter simply called a recording medium) is of a laminated structure made of a transparent electrode Et1, photoconductive layer PCL, dielectric mirror DMl, photo-modulation layer PML made of such as electro-optical crystal of lithium niobate, liquid crystal or the like, and transparent electrode Et2.

Writing optical information into the recording medium D1 is carried out either in the following two methods. According to the first method (hereinafter called Method 1), a light whose intensity has been modulated by information signal to be written is applied to the transparent electrode Et1, with a constant voltage applied between the transparent electrodes Et1 and Et2. The resistance of the photoconductive layer PCL applied with such intensity modulated light varies with the light intensity so that a charge corresponding to the light intensity is formed at the interface between the photoconductive layer PCL and the dielectric mirror DML. According to the second method (hereinafter called Method 2), with a light having a constant intensity being applied to the transparent electrode Et1, a voltage across the transparent electrodes Et1 and Et2 is changed in accordance with the information signal to be written so that a charge corresponding in amount to the voltage is generated at the interface between the photoconductive layer PCL and dielectric mirror DML.

As mentioned above, by intensity modulating a writing light by an information signal as in Method 1, or by amplitude modulating a writing voltage across the transparent electrodes Et1 and Et2 by an information signal, it becomes possible to generate a charge corresponding to the information signal at the interface between the dielectric mirror DML and photoconductive layer PCL whose resistance has been changed with the information signal.

An information signal is recorded with a beam of light having a very fine diameter being applied to the photoconductive layer PCL via the transparent electrode Etl, using Method 1 or 2. Owing to using such a fine diameter light beam, the resultant charge image corresponding to the information signal and formed at the interface between the photoconductive layer PCL and dielectric mirror DML has a very high resolution.

The charge image corresponding to an information signal and formed at the interface between the photoconductive layer PCL and dielectric mirror DML can be reproduced as an optical image upon application of a light toward the transparent electrode Et2, with the transparent electrodes Et1 and Et2 being shorted.

Specifically, upon application of a reading light to the transparent electrode Et2 of the recording medium D1 with the transparent electrodes Et1 and Et2 being shorted, the reading light passes through the photo-modulation layer PML such as an electro-optical crystal or a liquid crystal, and is reflected by the dielectric mirror DML and again passes through the photo-modulation layer PML then exits from the transparent electrode Et2. Since the photo-modulation layer PML changes its optical characteristic in accordance with an electrical field applied thereto, the light projected from the transparent electrode Et2 changes its optical characteristic in accordance with the electric charge image formed at the interface between the photoconductive layer PCL and dielectric mirror DML.

The change of optical characteristic of the light projected from the transparent electrode Et2 is transformed in the form of light intensity change to thereby obtain an optical image or the change may be transformed into modulated electric signals or video signals. If a reading light having a very small beam diameter is used, a video signal can be obtained from which an image of high resolution can be reproduced. Such a fine beam diameter light can be readily realized by using a laser beam as the reading light.

The charge image formed at the interface between the photoconductive layer PCL and dielectric mirror DML can be erased by lowering the resistance of the photoconductive layer PCL upon application of a light of certain intensity to the transparent electrode Et1, with the transparent electrodes Et1 and Et2 being shorted.

The right side of FIG. 4 showing an embodiment of the recording/reproducing apparatus with the recording medium D1 as above for high density recording/reproducing shows the recording and erasing section of the apparatus, and the left side shows the reproducing section of the apparatus. The rotary shaft (not shown) of the recording medium D1 extends laterally in FIG. 4.

The recording/reproducing apparatus shown in FIG. 4 is constructed of laser sources 101 and 102, lenses 103 to 107, polarizers 108 and 109, light modulator (electrooptic modulator) 110, wave plates 111 and 112, analyzers 113 and 114, beam splitter 115, photoelectric converter 116, amplifier 117, output terminal 118, switches 119 and 120, signal source 121 for an information signal to be written, and power source 122 for application of a predetermined voltage across transparent electrodes Et1 and Et2.

Of the switches 119 and 120, the movable contacts v are switched to fixed contacts a during the write mode of the recording/reproducing apparatus, and to fixed contacts b during the read mode. The movable contact v of the switch 120 is switched to the fixed contact b during the erase mode.

The operation during the write mode of the recording/reproducing apparatus shown in FIG. 4 will be described. During the write mode, the recording medium D1 is rotated at a predetermined revolution rate, and the recording section of the apparatus is moved in the radial direction of the recording medium D1 at a predetermined speed by a transporting mechanism (not shown) to form or follow a spiral track or a plurality of concentric tracks. The movable contacts v of the switches 119 and 120 are switched to the fixed contacts to apply a predetermined voltage across the transparent electrodes Et1 and Et2 by means of the power source 122 and supply an information signal to be written from the signal source 121 to the light modulator 110. The laser source 102 at the reproducing section is disabled.

A laser beam projected from the laser source 101 is made a parallel light by the lens 103 and made a linearly polarized light having a specific polarization plane by the polarizer 108 and thereafter, it is applied to the light modulator 110 whereat it is light modulated (polarization modulation) by the information signal from the signal source 121.

The laser beam projected from the light modulator 110 passes through the wave plate 111 for providing the same function mentioned for the wave plate 15 of FIG. 3, and is applied to the analyzer 113 from which a laser beam intensity-modulated by the information signal is outputted. If the light modulator 110 is electrically biased, the wave plate 111 may be omitted. The outputted laser beam is then converged by the lens 104 and projected to the photoconductive layer PCL via the transparent electrode Et1 of the recording medium D1.

Consequently, the resistance of the photoconductive layer PCL at the region where the laser beam has been projected changes with the light intensity of the laser beam so that an electric charge is generated at the interface between the photoconductive layer PCL and dielectric mirror DML, to thus obtain a charge image of the information signal of the object.

During the read mode of the recording/reproducing apparatus shown in FIG. 4, the laser source 101 at the recording section is disabled, and the movable contact v of the switch 120 is switched to the fixed contact b.

A reading laser beam projected from the laser source 102 is made a parallel light by the lens 106 to be applied to the polarizer 109 from which a linearly polarized light having a specific polarization plane is outputted. The outputted laser beam from the analyzer 109 passes through the beam splitter 115 and is converged by the lens 105 to be applied to the transparent electrode Et2 of the recording medium D1.

The reading laser beam applied to the transparent electrode Et2 passes the photo-modulation layer PML such as an electro-optical crystal or a liquid crystal, is reflected by the dielectric mirror DML, and passes again through the light modulation layer PML to be outputted from the transparent electrode Et2.

Since the photo-modulation layer PML changes its optical characteristic with an electrical field applied thereto from the charge image through the dielectric mirror DML the light outputted from the transparent electrode Et2 has a polarization plane modulated in accordance with the charge image formed during the write mode at the interface between the photoconductive layer PCL and dielectric mirror DML.

The light outputted from the transparent electrode Et2 of the recording medium D1 is reflected by the beam splitter 115 to be applied to the wave plate 112 which is used for providing an optical bias. The change in polarization plane of the laser beam outputted from the wave plate 112 is transformed into a change of light intensity by the analyzer 114 to be applied to the photoelectric conveter 116 for outputting a corresponding electric signal which is then amplified by the amplifier 117 and delivered to the output terminal 118.

Next, the operation of the erase mode of the recording/reproducing apparatus shown in FIG. 4 will be described. During the erase mode, the laser source 102 is disabled, and the movable contacts v of the switches 119 and 120 are switched to the fixed contacts b. The laser source 101 is turned on.

Under the above conditions, a laser beam projected from the laser source 101 is made a parallel light by the lens 103 and a linearly polarized light having a specific polarization plane by the polarizer 108. The laser beam then passes through the light modulator 110 where no modulation takes place, wave plate 111 and analyzer 113 from which a laser beam of certain intensity is outputted. The outputted laser beam is converged by the lens 104 to scan through the transparent electrode Et1 the desired track to be erased of the rotating recording medium D1.

The laser beam applied to the transparent electrode Et1 then passes through the photoconductive layer PCL. Since the resistance of the photoconductive layer PCL is made low because of application of the laser beam of certain intensity thereto, the charge formed on the dielectric mirror DML is discharged through a circuit path from the photoconductive layer PCL, transparent electrode Et1, fixed contact b of the switch 120, and its movable contact to ground, thus performing an erase operation.

Figure 5:
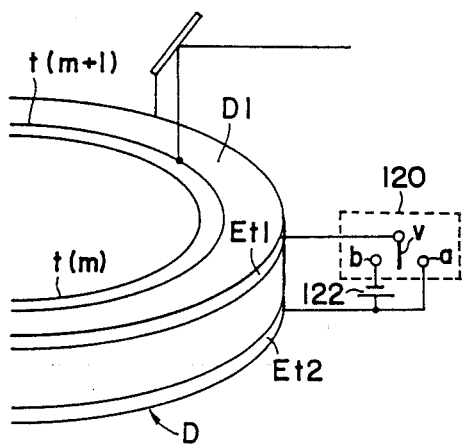
FIGS. 5 and 6 are views used for explaining the operation of the recording/reproducing apparatus.
Figure 6:
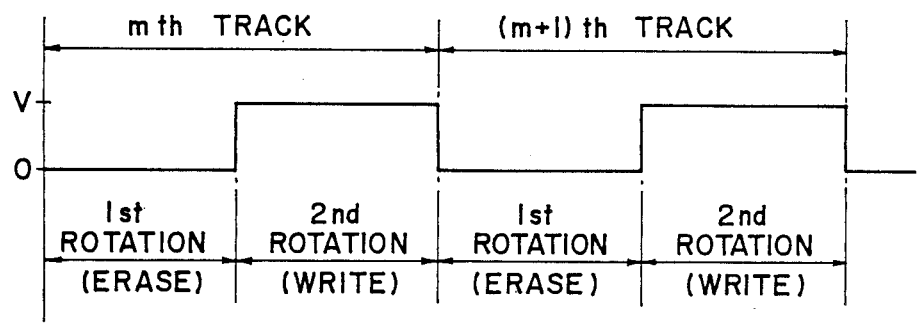

If a write operation is to be performed for the recording medium D1 with information already recorded, then an erase operation should be performed prior to the write operation. In such a case, if the same laser source is used both for the write and erase operations and if the same optical path is used for the operations, then it is possible to time divisionally perform the write and erase operations, the latter operation being performed prior to the former. FIG. 6 illustrates such time divisional operation wherein the write and erase operations are performed from m-th track t(m) and (m+1)-th track t(m+1) of the recording medium D1 having a number of concentric tracks (refer to FIG. 5).

In the time divisional operation shown in FIG. 6, first an erase operation for the m-th track of the recording medium D1 is performed followed by a write operation for a new information signal into the m-th track. Thereafter, an erase operation for the (m+1)-th track is performed followed by a write operation for a new information signal into the (m+1)-th track. It is apparent that a fraction of a track can also be altered in its memory content through such time divisional operation.

In the recording/reproducing apparatus shown in FIG. 4, the recording medium D1 has used the dielectric mirror DML which does not pass light but reflects it so that the reading and writing operations have been performed with respect to opposite sides of the recording medium D1. Another embodiment of the recording/reproducing apparatus shown in FIG. 7, however, allows the information reading and writing operations to be carried out from the same side of a recording medium D2. Specifically, the recording medium D2 is of a laminated structure constructed of a transparent electrode Et, photoconductive layer CPL, dielectric mirror DMLr having a wavelength selective characteristic which passes the writing and erasing lights and reflects the reading light, photo-modulation layer PML made of an electro-optical crystal such as lithium niobate crystal or liquid crystal, and electrode E.

Writing optical information into the recording medium D2 is carried out in the following two methods. According to the first method (hereinafter called Method 1), a light whose amplitude has been modulated by information signal to be written is projected toward the transparent electrode Et, with a constant voltage applied between the transparent electrode Et and electrode E. The resistance of the photoconductive layer PCL applied with such intensity modulated light after passing through the photoconductive layer PML and dielectric mirror DMLr varies with the light intensity so that a charge corresponding to the light intensity is formed at the interface between the photoconductive layer PCL and the dielectric mirror DMLr. According to the second method (hereinafter called Method 2), with a light having a constant intensity being projected toward to the transparent electrode Et, instead of keeping a constant value voltage across the transparent electrode Et and electrode E is modulated in accordance with the object information so that a charge corresponding to the modulated voltage is generated at the interface between the photoconductive layer PCL and dielectric mirror DMLr.

As stated above, by intensity modulating the writing light by an information signal as in Method 1, or by amplitude modulating the voltage across the transparent electrode Et and electrode E by an information signal, it becomes possible to generate a charge corresponding to the information signal at the interface between the dielectric mirror DML r and photoconductive layer PCL whose resistance has been changed with the information signal.

An information signal is recorded with a light having a very fine beam diameter being applied to the photoconductive layer PCL with the transparent electrode Et, photo-modulation layer PML and dielectric mirror DML, using Method 1 or 2. Owing to using such a fine beam diameter light, the resultant charge image corresponding in amount of charge to the information signal and formed at the interface between the photoconductive layer PCL and dielectric mirror DMLr has a very high resolution.

The charge image corresponding in the amount of charge to an information signal and formed at the interface between the photoconductive layer PCL and dielectric mirror DMLr can be reproduced as an optical image upon application of a light projected toward the transparent electrode Et, with the transparent electrode Et and electrode E being shorted.

Specifically, upon projection of a reading light toward the transparent electrode Et of the recording medium D2 with the transparent electrode Et and electrode E being shorted, the reading light passes through the photo-modulation layer PML such as an electro-optical crystal or a liquid crystal, and is reflected by the dielectric mirror DMLr having a reflection characteristic for the reading light wavelength and again passes through the photo-modulation layer PML then exits from the transparent electrode Et. Since the photo-modulation layer PML changes its optical characteristic in accordance with an electrical field applied thereto from the charge image through the dielectric mirror DMLr, the light projected from the transparent electrode Et changes its optical characteristic or mode in accordance with the electric charge image formed at the interface between the photoconductive layer PCL and dielectric mirror DMLr.

The change of optical characteristic of the light outputted from the transparent electrode Et is transformed in the form of light intensity change to thereby obtain an optical image or the change may be transformed into modulated electric signals or video signals. If a reading light having a very small diameter is used, a video signal can be obtained from which an image of high resolution can be reproduced. Such a fine beam diameter light can be readily realized by using a laser beam as the reading light.

The charge image formed at the interface between the photoconductive layer PCL and dielectric mirror DMLr can be erased by lowering the resistance of the photodoconductive layer PCL upon application of a light of certain intensity toward the transparent electrode Et, with the transparent electrode Et and electrode E being shorted.

Figure 7:
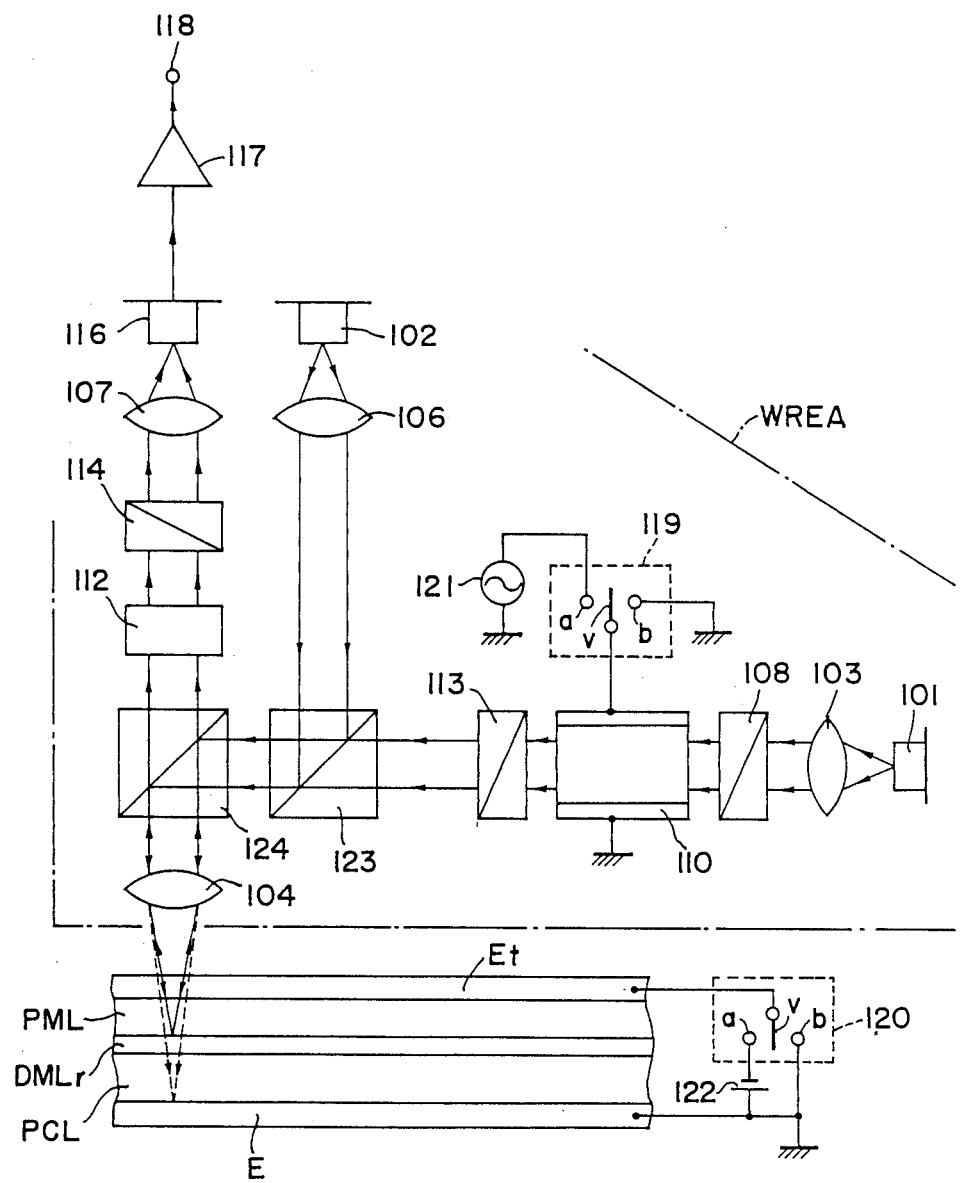

FIG. 7 also shows the recording/reproducing apparatus for the recording medium D2 as explained above.

The recording/reproducing apparatus shown in FIG. 7 is constructed of laser sources 101 and 102, lenses 103, 104, 106 and 107, polarizer 108, light modulator 110, wave plate 112, analyzers 113 and 114, beam splitters 123 and 124, photoelectric converter 116, amplifier 117, output terminal 118, switches 119 and 120, signal source 121 for an information signal to be written, and power source 112 for application of a predetermined voltage across transparent electrode Et and electrode E of the recording medium D2.

Of the switches 119 and 120, the movable contacts v are switched to fixed contacts a during the write mode of the recording/reproducing apparatus, and to fixed contacts b during the read mode. The movable contact v of the switch 120 is switched to the fixed contact b during the erase mode.

The operation during the write mode of the recording/reproducing apparatus shown in FIG. 7 will be described. During the write mode, the recording medium D2 is rotated at a predetermined revolution rate, and the recording, reproducing and erasing sections of the apparatus are moved in the radial direction of the recording medium D2 at a predetermined speed by a transporting mechanism (not shown). The movable contacts v of the switches 119 and 120 are switched to the fixed contacts to apply a predetermined voltage across the transparent electrode Et and electrode E by means of the power source 122 and supply an information signal to be written from the signal source 121 to the light modulator 110. The laser source 102 at the reproducing section is disabled.

A laser beam projected from the laser source 101 is made a parallel light by the lens 3 and made a linearly polarized light having a specific polarization plane by the polarizer 108 and thereafter, it is applied to the light modulator 110 whereat it is light modulated (polarization modulation) by the information signal from the signal source 121.

The laser beam outputted from the light modulator 110 is applied to the analyzer 113 from which the laser beam amplitude-modulated by the information signal is outputted. If desired, a wave plate (not shown) may be inserted as an option between the light modulator 110 and the analyzer 113 as in FIG. 4. The outputted laser beam is then converged by the lens 104 via the beam splitters 123 and 124 and applied to the photoconductive layer PCL penetrating through the transparent electrode Et of the recording medium D2, photo-modulation layer PML and dielectric mirror DMLr having a wavelength selection characteristic (the laser beam outputted from the lens 104 is indicated by a dotted line in FIG. 7).

Consequently, the resistance of the photoconductive layer PCL at the region where the laser beam has been applied changes with the lintensity of the laser beam so that a charge is generated at the interface between the photoconductive layer PCL and dielectric mirror DMLr, to thus obtain a charge image of the information signal intended to be written.

During the read mode of the recoding/reproducing apparatus shown in FIG. 7, the laser source 101 at the recording section (commonly used for the erasing section) is disabled, and the movable contact v of the switch 120 is switched to the fixed contact b.

A reading laser beam projected from the laser source 102 is made a parallel light by the lens 106 then applied to the lens 104 via the beam splitters 123 and 124. The converged laser beam is then applied to the transparent electrode Et of the recording medium D2.

The reading laser beam applied to the transparent electrode Et passes the photo-modulation layer PML such as an electro-optical crystal or a liquid crystal, is reflected by the dielectric mirror DMLr, and passes again through the photo-modulation layer PML to be outputted from the transparent electrode Et (refer to the beam indicated by a solid line in FIG. 7).

Since the photo-modulation layer PML changes its optical characteristic with an electrical field applied thereto from the charge image through the dielectric mirror DMLr, the light outputted from the transparent electrode Et has a polarization plane changed in accordance with the charge image formed during the write mode.

The light projected from the transparent electrode Et of the recording medium D2 passes through the lens 104 and beam splitter 124 and is applied to the wave plate 112 which is used for providing an optical bias. The change in polarization plane of the laser beam outputted from the wave plate 112 is transformed into a change of light intensity by the analyzer 114 then the light is applied to the photoelectric converter 116 for converting it to a corresponding electric signal which is then amplified by the amplifier 117 and delivered to the output terminal 118.

Next, the operation of the erase mode of the recording/reproducing apparatus shown in FIG. 7 will be described. During the erase mode, the laser source 102 is disabled, and the movable contacts v of the switches 119 and 120 are switched to the fixed contacts b. The laser source 101 is turned on.

Under the above conditions, a laser beam projected from the laser source 101 is made a parallel light by the lens 103 and a linearly polarized light having a specific polarization plane by the polarizer 108. The laser beam then passes through the light modulator 110 where no modulation takes place, analyzer 113, beam splitters 123 and 124 from which a laser beam of certain intensity is outputted. The outputted laser beam is converged by the lens 104 to scan through to the transparent electrode Et the desired track to be erased of the rotating recording medium D2.

The laser beam applied to the transparent electrode Et then passes through the transparent electrode Et and the photo-modulation layer PML such as an electro-optical crystal or a liquid crystal, thereafter is reflected by the dielectric mirror MDLr, again passes through the photo-modulation layer PML, and is outputted through the transparent electrode Et (the laser beam outputted from the lens 4 is indicated by a dotted line in FIG. 7). Since the resistance of the photoconductive layer PCL is made low because of application of the laser beam of certain intensity thereto, the charge formed on the dielectric mirror DMLr is discharged through a circuit path from the photoconductive layer PCL, electrode Et and to the ground, thus performing an erase operation.

If a write operation is to be performed for the recording medium D2 with information already recorded, then an erase operation should be performed prior to the write operation. In such a case, if the same laser source is used both for the write and erase operations and if the same optical path is used for the operations as in the embodiment shown in FIG. 5, then it is possible to time divisionally perform the write and erase operations in the similar manner as of the recording/reproducing apparatus shown in FIG. 4, the latter operation being performed prior to the former.

In the embodiment recording/reproducing apparatus shown in FIGS. 4 to 7, the photo-modulation layer PML has been used in the recording medium D1, D2. Instead of the photo-modulation layer PML of the recording medium D1, D2, a material having both functions of the electro-optical effect and photoconductive effect such as a monocrystal $Bi_{13}SiO_{20}$ (which presents a photoconductive nature to blue light) may be used to thus serve as both the photo-modulation layer PML and photoconductive layer PCL.

Typical modifications of the embodiment of this invention are shown in FIGS. 8 to 19. The recording/reproducing apparatus shown in FIGS. 8 to 19 use a recording medium different from those already described with FIGS. 4 and 7. The reading and writing arrangements thereof are also different from those shown in FIGS. 4 and 7 wherein the two electrodes are both fixedly attached to the recording medium. However, in the embodiment shown in FIG. 8, one of the two electrodes is arranged spaced apart from the recording medium. Even if one of the two electrodes is spaced apart from the recording medium, a charge on the recording medium can be developed through gaseous discharge over the narrow air gap being subjected to an electric field built up between two electrodes. Therefore, the operation of the electric field and the laser beam during the writing operation is the same for the group of embodiments of FIGS. 8 to 19 and the group of embodiments of FIGS. 4 and 7. Thus, the same operation as the apparatus shown in FIGS. 4 and 7 can be ensured for the recording/reproducing apparatus shown in FIGS. 8 to 19.

Although the gap distance between the electrode or head and the recording medium is shown in an enlarged scale in FIGS. 8 to 19, the gap distance therebetween is very small in reality. Therefore, during the writing operation for example, the charge on the recording medium can be readily transferred through a gaseous discharge over the narrow air gap, under the condition of the low resistance of the photoconductive layer which is being applied with an electric field and is present between two electrodes.

Figure 8:
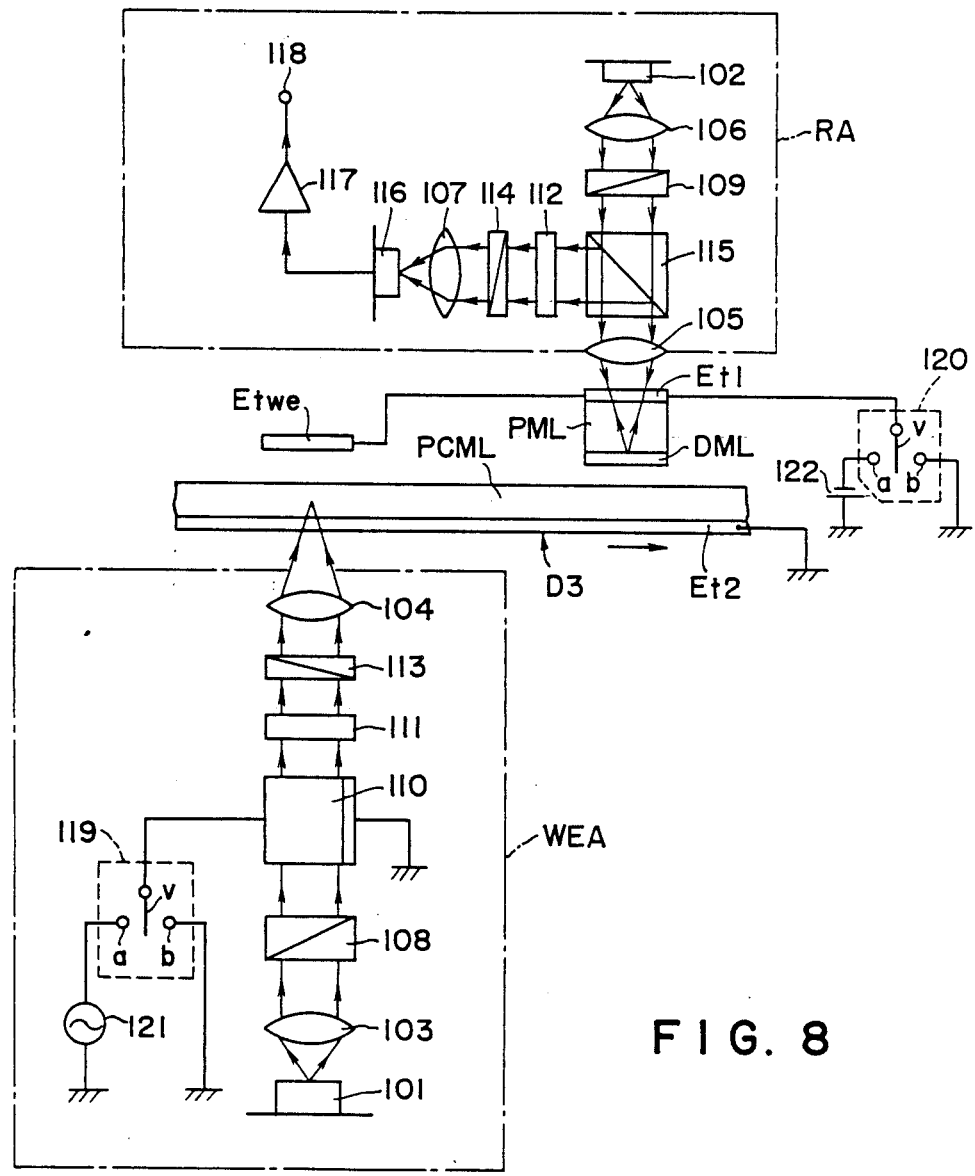

A recording medium D3 used in the recording/reproducing apparatus shown in FIGS. 9 to 19 is constructed of a transparent electrode Et2 and a photoconductive layer PCL. Referring to FIG. 8, the recording/reproducing apparatus is constructed of laser sources 101 and 102, lenses 103, 104, 105, 106 and 107, polarizers 108 and 109, light modulator 110, wave plates 111 and 112, analyzers 113 and 114, beam splitter 115, photoelectric converter 116, amplifier 117, output terminal 118, switches 119 and 120, signal source 121 for an information signal, and power source 122 for supplying a predetermined voltage across the electrode Etwe connected to the transparent electrode Et2 and electrode Et1 of the recording medium D3.

The unit surrounded by a one-dot-chain line and indicated by WEA in FIG. 8 performs writing and erasing operations in which light beams are projected onto the recording medium D3. Only such representation of one-dot-chain line marked WEA is used commonly to the other embodiments described later. The unit surrounded by a one-dot-chain line and indicated by RA performs a reading operation in which a reading light beam is projected onto the recording medium D3. Only such representation of one-dot chain line marked RA is used commonly to the other embodiments described later.

During the write mode of the recording/reproducing apparatus, the unit WEA is arranged to project from the lens 104 a laser beam intensity-modulated by an information signal to be recorded. The laser beam projected from the laser source 101 is made a parallel light by the lens 103 and a linearly polarized light having a specific polarization plane by the polarizer 8, and is applied to the light modulator 110 whereat it is light modulated by the information signal supplied from the signal source. The laser beam outputted from the light modulator 110 is optical biased by the wave plate 111 and applied to the analyzer 113 from which the laser beam intensity-modulated by the information signal is outputted to the lens 104. The laser beam converged by the lens 104 is applied to the recording medium for recording.

During the erase mode of the recording/reproducing apparatus, the unit WEA is also arranged to project from the lens 104 a laser beam of certain intensity.

The unit RA operates as follows. The reading laser beam projected from the reproducing laser source 102 is made a parallel light by the lens 106 in turn applied to the analyzer 109. The laser beam outputted from the analyzer 109 is applied to the lens 105 via the beam splitter 115. The reading laser beam converged by the lens 105 is applied to a reading head constructed as described later. The laser beam being reflected in the reading head and containing the recorded information of the recording medium is outputted from the reading head and forwarded to the lens 105. The laser beam from the lens 105 is then applied to the wave plate 112 via the beam splitter 115. The laser beam with its intensity modulated in accordance with a polarization plane change then outputted from the analyzer 114 to be applied to the photoelectric converter 116 which outputs an electric signal whose amplitude varies with the modulated light intensity. The outputted electric signal is then amplified by the amplifier 117 and delivered to the output terminal 118.

The recording medium D3 of the recording/reproducing apparatus shown in FIG. 8 is of a laminated structure of the transparent electrode Et2 and the photoconductive layer PCML which posseses both functions of the electro-optical effect and photoconductive effect as explained in the foregoing. The writing and erasing light beams are directed to the transparent electrode Et2 of the recording medium from the unit WEA. However, the recording medium has only one transparent electrode Et2 and is not having the other electrode which would otherwise make a combination with the transparent electrode Et2 serving to apply an electric field to the recording medium D3.

Instead of having the other electrode on the recording medium D3, the other electrode or recording electrode Etwe connected to a movable contact v of the switch 120 is arranged movabable together with the unit WEA so as to oppose the lens 104 interposing the recording medium D3 including the transparent electrode Et2 of the recording medium D3 to which writing and erasing light beams are directed, in order to enable application of an electric field therebetween. Also movably arranged between the recording medium D3 and the lens 105 of the array RA is a reading head of a laminated structure constructed of a transparent electrode Et1, photo-modulation layer PML such as an electro-optical crystal lithium niobate crystal or a liquid crystal, and dielectric mirror DML.

With the above construction of the recording/reproducing apparatus shown in FIG. 8, the recording, reproducing and erasing operations similar to those by the recording/reproducing apparatus described with FIG. 4 can be performed. This can be easily understood from the fact that the laser beam and the electric field between two electrodes operate in the same manner both cases of the recording/reproducing apparatus shown in FIG. 8 and FIG. 4.

The recording/reproducing apparatus shown in FIG. 4 uses the recording medium having two electrodes fixedly provided thereto, whereas the recording/reproducing apparatus shown in FIG. 8 uses the recording medium having one electrode closely spaced apart from the recording medium. In the latter case, as described previously, a charge on the recording medium can be transferred through gaseous discharge over the narrow air gap under an electric field built between two electrodes, thus posing no problems of a writing operation.

Figure 9:
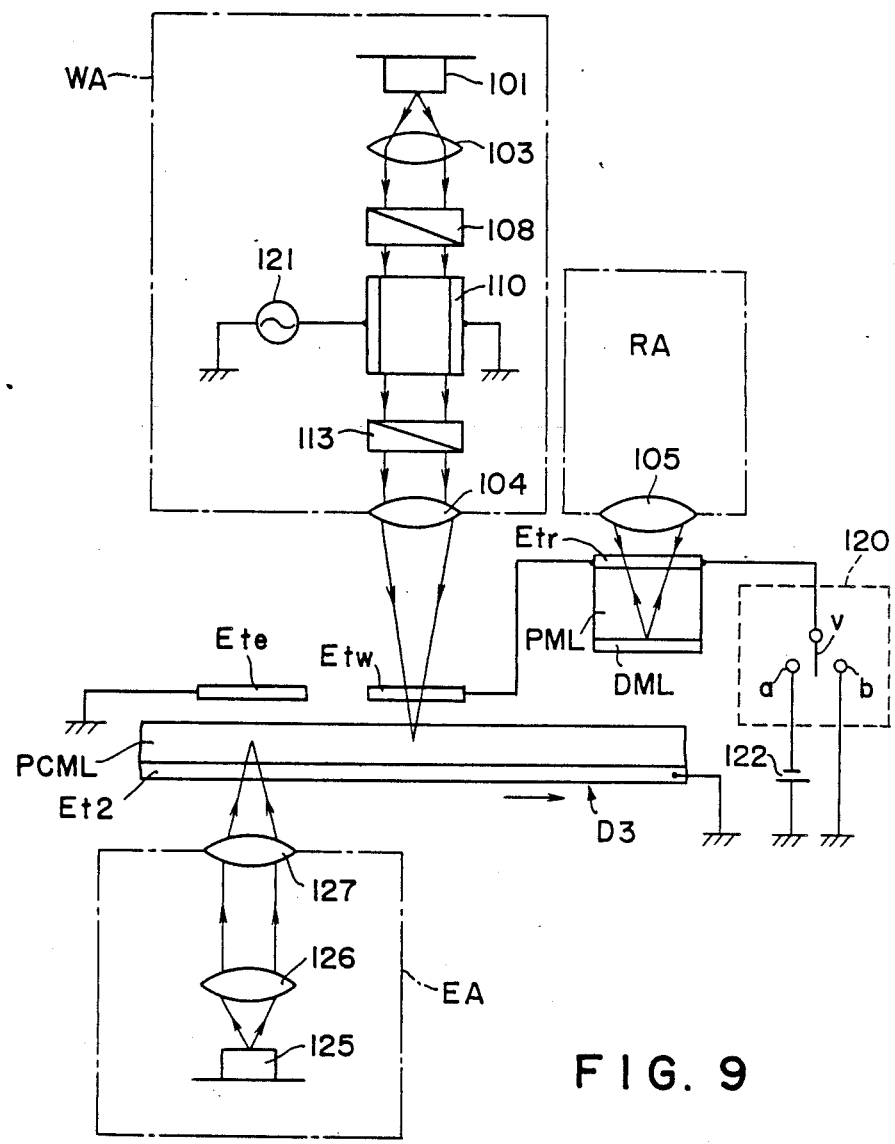

The recording/reproducing apparatus shown in FIG. 9 uses the same recording medium D3 as used with the apparatus shown in FIG. 8. However, in the embodiment shown in FIG. 9, only the erasing operation is performed with respect to the transparent electrode Et2 of the recording medium D3, and the writing and reading operations are performed on the side of the recording medium D3 opposite to that where the erasing light beam is applied.

The unit surrounded by a one-dot-chain line and indicated by WA in FIG. 9 operates to apply a writing beam onto the recording medium D3. Only such representation of one-dot-chain line marked WA is used commonly to the other embodiments described later. The unit surrounded by a one-dot-chain line and indicated by EA operates to apply an erasing beam onto the recording medium D3. Only such representation of one-dot-chain line marked EA is used commonly to the other embodiments described later.

During the write mode of the recording/reproducing apparatus, the unit WA is arranged to project from the lens 104 a laser beam intensity-modulated by an information signal to be recorded. The laser beam projected from the laser source 101 is made a parallel light by the lens 103 and a linearly polarized light having a specific polarization plane by the polarizer 108, and is applied to the light modulator 110 whereat it is light modulated by the information signal supplied from the signal source 121. The laser beam outputted from the light modulator 110 is applied to the analyzer 113 from which the laser beam intensity-modulated by the information signal is outputted to the lens 104. The laser beam converged by the lens 104 is applied to the recording medium through a transparent electrode Etw to which a predetermined voltage is provided from the power source 122 via the switch 120.

During the erase mode of the recording/reproducing apparatus, the unit EA is also arranged to project a laser beam from the laser source 125 to the lens 127 via the lens 126, to thus apply the laser beam of certain intensity to the recording medium The unit RA shown in FIG. 9 has the same structure as that of the unit RA shown in FIG. 8.

An electrically grounded electrode Ete is movably arranged to oppose the lens 127 interposing therebetween the recording medium D3 including the transparent electrode Et2 which is grounded also, and erasing light beam is applied, to the photoconductive layer PCL interposed between the two grounded electrodes to perform the erasing. Also movably mounted on the unit WA between the recording medium D3 and the lens 104 is a transparent electrode Etw. Further movably mounted on the unit RA between the recording medium and the land 105 is a reading head of a laminated structure constructed of a transparent electrode Etr, photo-modulation layer PML such as an electro-optical crystal lithium niobate crystal or a liquid crystal, and dielectric mirror DML.

With the above construction of the recording/reproducing apparatus shown in FIG. 9, it can be easily understood that the recording, reproducing and erasing operations similar to those by the recording/reproducing apparatus described with FIG. 4 can be performed.

Figure 10:
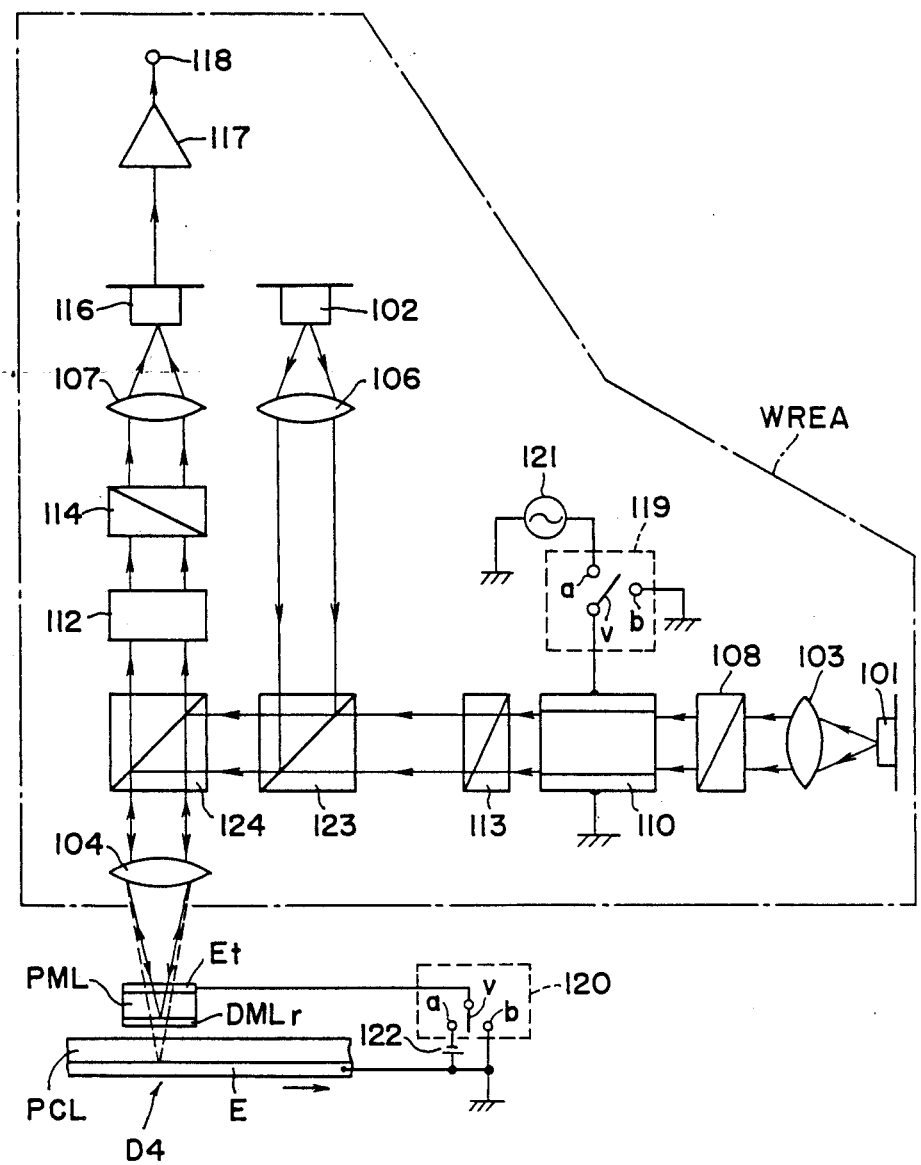

The recording/reproducing apparatus shown in FIG. 10 uses the recording medium D4 constructed of an electrode E and a photoconductive layer PCL. In FIG. 10, the unit surrounded by a one-dot-chain line and indicated by WREA operates to apply writing, reading and erasing light beams onto the recording medium D4. The WREA has the same structure as that of the WREA shown in FIG. 7. Only such representation of one-dot-chain line marked WREA is used commonly to the other embodiments described later.

In the recording/reproducing apparatus shown in FIG. 10, movably arranged with the unit WREA between the lens 104 and the recording medium D4 is a head having a laminated structure constructed of a transparent electrode Et, photo-modulation layer PML such as an electro-optical crystal of lithium niobate crystal or a liquid crystal, and dielectric mirror DMLr having a wavelength selective characteristic.

With the above construction of the recording/reproducing apparatus shown in FIG. 10, it can be easily understood that the recording, reproducing and erasing operations similar to those of the recording/reproducing apparatus described with FIG. 7 can be performed.

The recording medium D5 used with the embodiments of the recording/reproducing apparatus shown in FIGS. 11 to 14 is of a laminated structure constructed of an electrode E and an insulating layer IL which is made of a material such as silicone resin having a high insulating resistance and capable of holding a charge image formed thereon for a long period of time.

In the embodiment recording/reproducing apparatus shown in FIG. 11, arranged with the unit WEA between the lens 104 and the insulating layer IL of the recording medium D5 to which writing and erasing light beams are projected is a head having a laminated structure constructed of a transparent electrode Et and photoconductive element PCE. Also arranged with the unit RA between the lens 105 and the insulating layer IL of the recording medium D5 to which a reading light beam is projected is a reading head having a laminated structure constructed of a transparent electrode Etr, photo-modulation layer PML such as an electro-optical crystal of lithium niobate crystal of a liquid crystal, and dielectric mirror DML.

Figure 13:
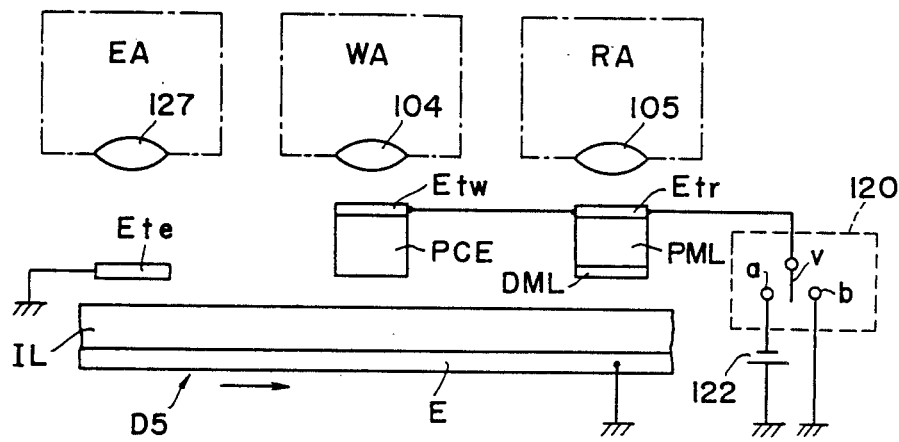

In the embodiment recording/reproducing apparatus shown in FIG. 13, arranged with the unit EA between the lens 127 and the insulating layer IL of the recording medium D5 to which an erasing light beam is projected is a transparent electrode Ete. Also arranged with the unit WA between the lens 104 and the insulating layer IL of the recording medium D5 to which a writing light beam is projected is a head having a laminated structure constructed of transparent electrodes Etw and Et and photoconductive element PCE. Also provided with the unit RA between the lens 105 and the insulating layer IL of the recording medium D5 to which a reading light beam is projected is a reading head having a laminated structure constructed of a transparent electrode Etr, photo-modulation layer PML such as an electro-optical crystal of lithium niobate crystal or a liquid crystal, and dielectric mirror DML.

In the recording/reproducing apparatus shown in FIGS. 11 to 13, an electric charge image formed on the surface of the insulating layer IL of the recording medium D5 is read out with reading unit by using an electro-optical effect such as Pockels effect, Kerr effect etc.

Figure 14:
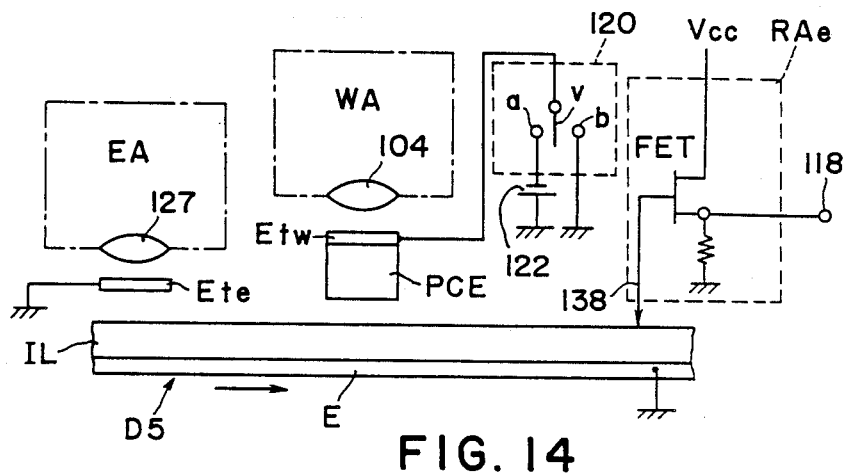

In the embodiment recording/reproducing apparatus shown in FIG. 14, arranged with the unit array EA between the lens 127 and the insulating layer IL of the recording medium D5 to which an erasing light beam is projected is a transparent electrode Ete. Also arrarranged with the unit WA between the lens 104 and the insulating layer IL of the recording medium D5 to which a writing light beam is projected is a head having a laminated structure constructed of transparent electrodes Etw and Et and photoconductive element PCE. Also provided is a reading head unit RAe for reading an information signal from the recording medium D5 with a needle electrode 138. An electric charge image corresponding to the information signal and formed on the surface of the insulating layer IL of the recording medium D5 is electrostatically read with the reading unit.

In the embodiment shown in FIG. 14, an electric charge image formed on the insulating layer IL of the recording medium D5 is detected by the needle electrode 138 of the reading head array RAe which is positioned closely spaced from the surface of the insulating layer IL. A voltage detected from the charge image on the insulating layer with the needle electrode 138 is applied to the gate of a field effect transistor FET to obtain an output signal from the source thereof. It is apparent that the needle electrode may use a multi-needle type electrode. The recording medium D6 used in the embodiment recording/reproducing apparatus shown in FIGS. 15 and 16 has a laminated structure constructed of an electrode Edml serving as a dielectric mirror, and photo-modulation layer PML such as an electro-optical crystal of lithium niobate or a liquid crystal.

Figure 15:
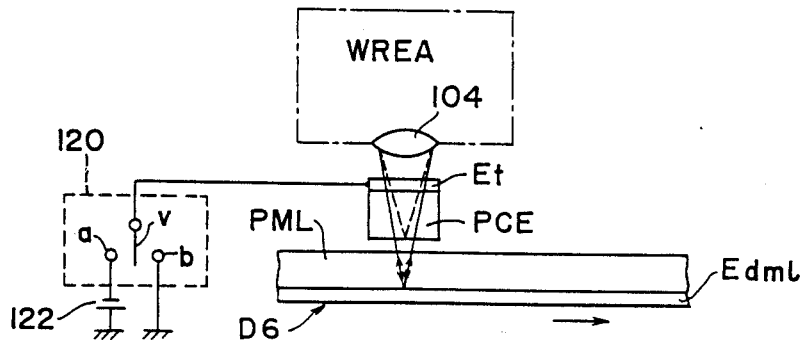

In the embodiment recording/reproducing apparatus shown in FIG. 15, arranged with the unit WREA between the lens 104 and the photo-modulation layer PML of the recording medium D6 to which writing, reading and erasing light beams are projected is a head having a laminated structure constructed of a transparent electrode Et and photoconductive element PCE. In the embodiment recording/reproducing apparatus shown in FIG. 16, arranged with the unit WEA between the lens 104 and the photo-modulation layer PML of the recording medium D6 to which writing and erasing light beams are projected is a head having a laminated structure constructed of a transparent electrode Et and photoconductive element PCE. The unit RA for application of a reading light beam onto the recording medium D6 is arranged facing the surface of the photo-modulation layer PML. In the embodiments shown in FIGS. 15 and 16, an electric charge image corresponding to an information signal of an object and formed on the surface of the photo-modulation layer PML is read with the reading unit by using the electro-optical effect.

Figure 16:
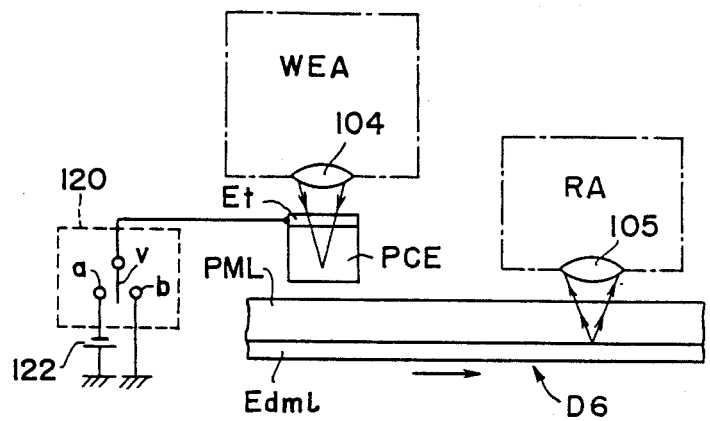

The recording medium D6 used with the embodiment apparatus shown in FIGS. 15 and 16 uses the photo-modulation layer PML. However, instead of using the photo-modulation layer PML, a layer made of a material such as a monocrystal of $Bi_{13}SiO_{20}$ having both the electro-optical effect and photoconductive effect may be used.

Figure 17:
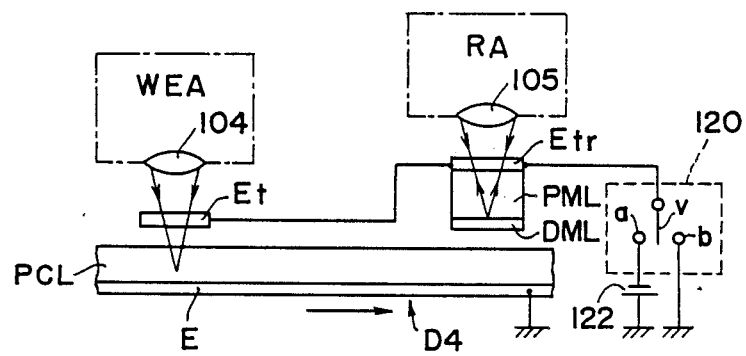

The recording medium D4 used with the embodiment recording/reproducing apparatus shown in FIG. 17 is constructed of an electrode E and photoconductive layer PCL similar to that shown in FIG. 10. In the embodiment recording/reproducing apparatus shown in FIG. 17, arranged with the unit WEA between the lens 104 and the photoconductive layer PCL of the recording medium D4 to which writing and erasing light beams are projected is a transparent electrode Et. Also arranged with the unit RA between the lens 105 and the photoconductive layer PCL of the recording medium D4 to which a reading light beam is projected is a reading head having a laminated structure constructed of a transparent electrode Etr, photo-modulation layer PML such as an electro-optical crystal of lithium niobate or a liquid crytal, and dielectric mirror DML. In the embodiment shown in FIG. 17, an electric charge image corresponding to the information signal and formed on the surface of the photoconductive layer PCL of the recording medium D4 is read with the reading unit by using the electro-optical effect.

Figure 18:
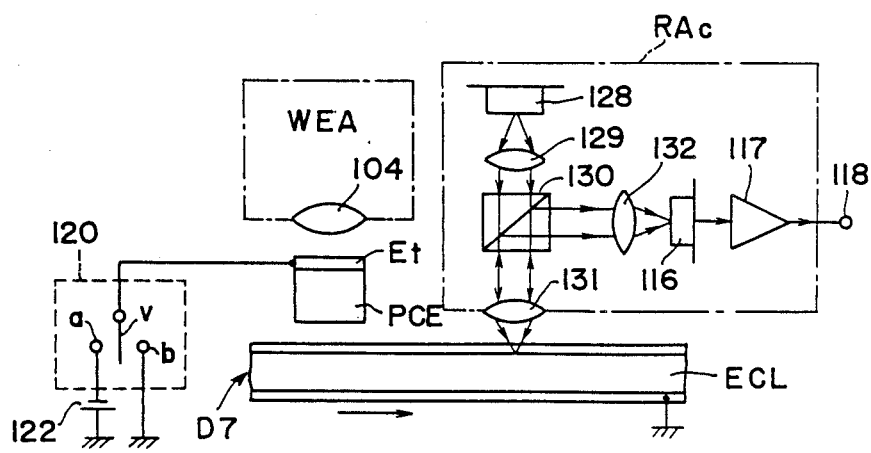

The recording medium D7 used with the embodiment recording/reproducing apparatus shown in FIG. 18 is constructed of an electrode E and electrochromic layer ECL on the surface of which a transparent insulating layer is provided if necessary.

In the embodiment recording/reproducing apparatus shown in FIG. 18, arranged with the unit WEA between the lens 104 and the electrochromic layer ECL of the recording medium D7 to which writing and erasing light beams are projected is a head having a laminated structure constructed of a transparent electrode Et, and photoconductive element PCE. The reading unit RAc for application of a reading light beam onto the recording medium D7 is arranged opposing the surface of the electrochromic layer ECL. In the embodiment shown in FIG. 18, the reading unit RAc for application of a reading light beam can be constructed in a simple structure.

The reading unit RAc shown in FIG. 18 is constructed of a light source 128, lenses 129, 131, and 132, beam splitter 130, photoelectric converter 116, and amplifier 117. A laser beam intensity-modulated by an information signal and applied through the lens 104 of the unit WEA is projected toward the transparent electrode Et and photoconductive element PCE. Upon the laser beam projection, the resistance of the photoconductive element PCE lowers at the position where the laser beam was spotted so that an electric charge image is formed on the electrochromic layer ECL of the recording medium D7 through gaseous discharge between the photoconductive element PCE and electrochromic element ECL.

A color of the electrochromic layer ECL where the intensity modulated laser beam spotted changes with the amount of charge at the spot. The change of color renders a change of reflectivity or a color selectivity to a light projected thereto, so that upon application of a reading light beam onto the recording medium D7, the spot or portion with its color being changed correspondingly with the information signal can be detected by the photoelectric converter 116 as the reflected light supplied thereto changes its intensity. An output from the photoelectric converter 116 is amplified by the amplifier 117 to be delivered to the output terminal 118.

As stated above, in the recording/reproducing apparatus shown in FIG. 18, since the electric charge image can be read in the form of a reflected light with its intensity changed, the unit RAc for application of the reading light beam can be constructed in a simple structure.

Figure 19:
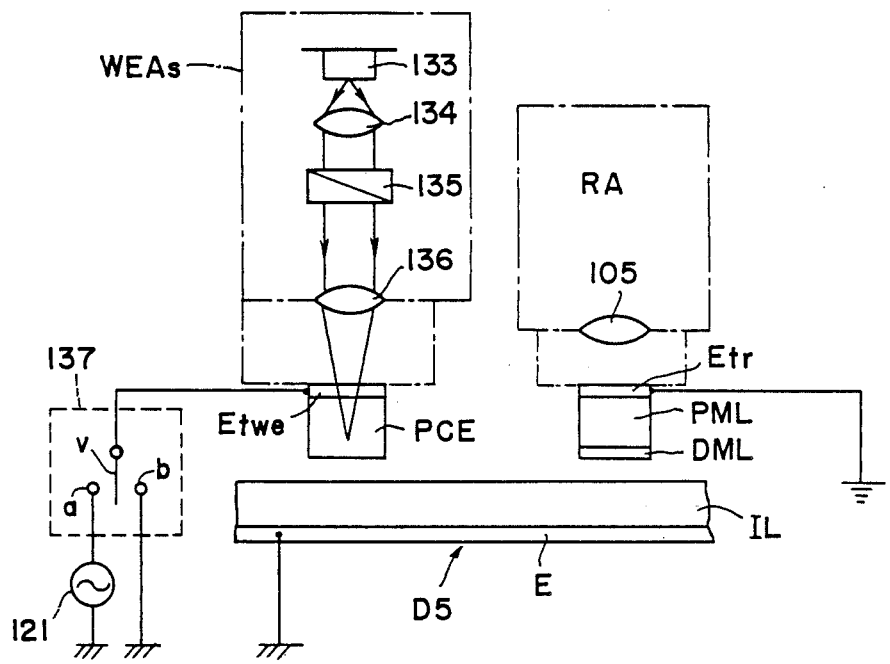

The recording/reproducing apparatus shown in FIG. 19 shows an application to the apparatus shown in FIG. 11 wherein a voltage applied to the recording medium is changed with an information signal while applying a laser beam of constant intensity. Such information signal recording method can be applied also to the other embodiments already described.

A difference of the apparatus shown in FIG. 19 from that shown in FIG. 11 is the structure of the unit WEAs and that an information signal is applied to the transparent electrode Etwe of the head via the switch 137.

It is apparent that an electric charge image can be recorded on the recording medium by the voltage applied to the recording medium being changed with the information signal while maintaining the writing light beam intensity constant, as in the embodiment shown in FIG. 19. In the recording/reproducing apparatus shown in FIG. 19, arranged with the unit WEAs between the lens 136 and the insulating layer IL of the recording medium D5 to which writing and erasing light beams are projected is a head having a laminated structure constructed of a transparent electrode Etwe and a photoconductive element PCE. Also arranged with the unit RA between the lens 105 and the insulating layer IL of the recording medium D5 to which a reading light beam is projected is a reading head having a laminated structure constructed of a transparent electrode Etr which is kept grounded, photo-modulation layer PML such as an electro-optical crystal of lithium niobate or a liquid crystal, and dielectric mirror DML.

In the foregoing embodiments, although the recording medium has been described as of a disk type, it may be of other types such as tape type or the like.

As will be readily understood from the foregoing description of the recording/reproducing apparatus of this invention, an information signal may be either an analog signal or a digital signal. In the latter case, a writing light beam is turned on and off for recording an information signal in a form of binary code on the recording medium, further, a plurality of writing light levels may be arranged correspondence with a set of information bits. In this manner, an information signal of high resolution or density can be recorded simply by using a set of bit combination each of which is represented by a different light level. Such an example is shown in the Table below wherein a writing light having eight levels, i.e., eight charge quantity levels ($Q0$ to $Q7$) each of which is represented by a combination of red, green and blue color data bits.

| R | G | B | Charge Quantity $Q_i$ |
|---|---|---|---|
| 0 | 0 | 0 | $Q0$ |
| 0 | 0 | 1 | $Q1$ |
| 0 | 1 | 0 | $Q2$ |
| . | . | . | . |
| . | . | . | . |
| 1 | 1 | 1 | $Q7$ |

Figure 20:
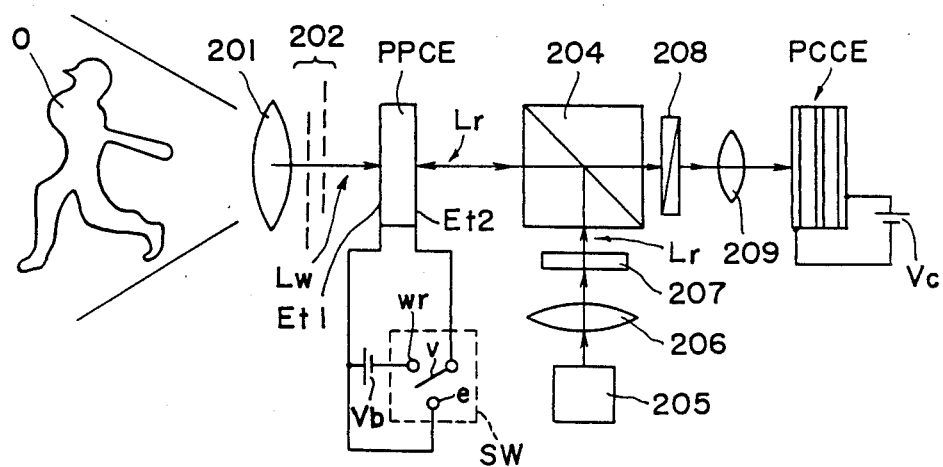
FIGS. 20 to 22 are block diagrams showing briefly the embodiments of the image pickup apparatus of the invention.
Figure 21:
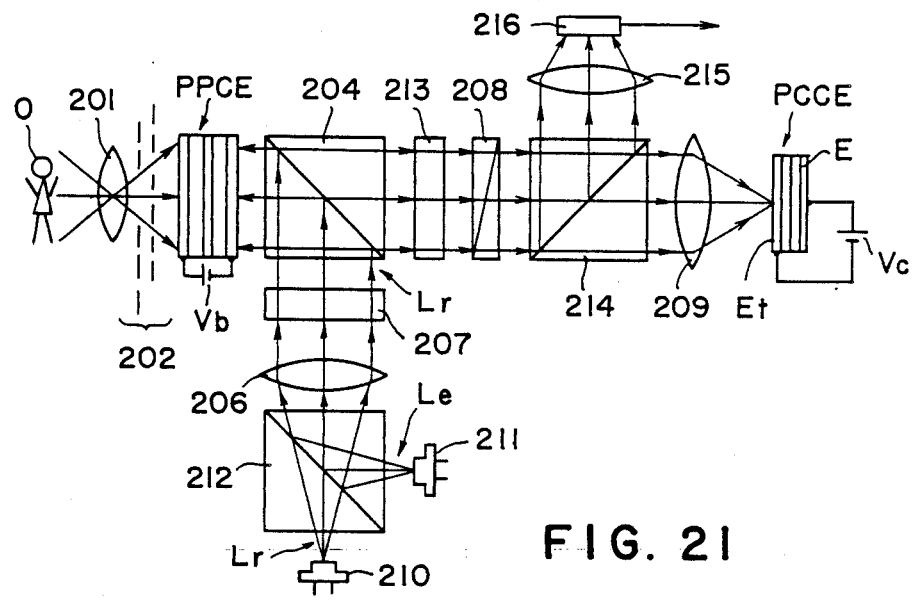
Figure 22:
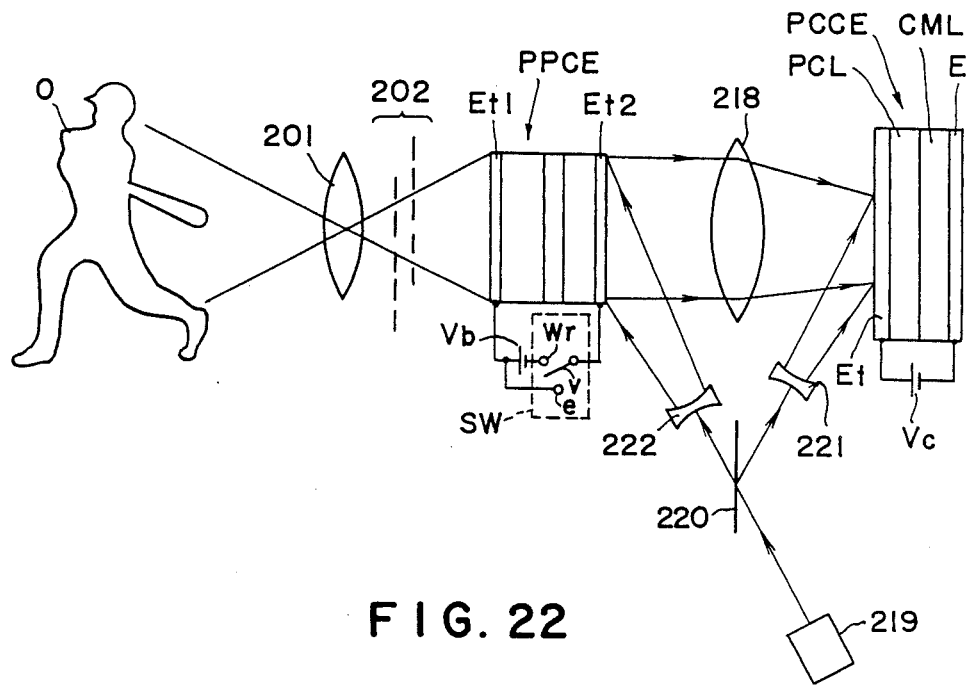
Figure 23:
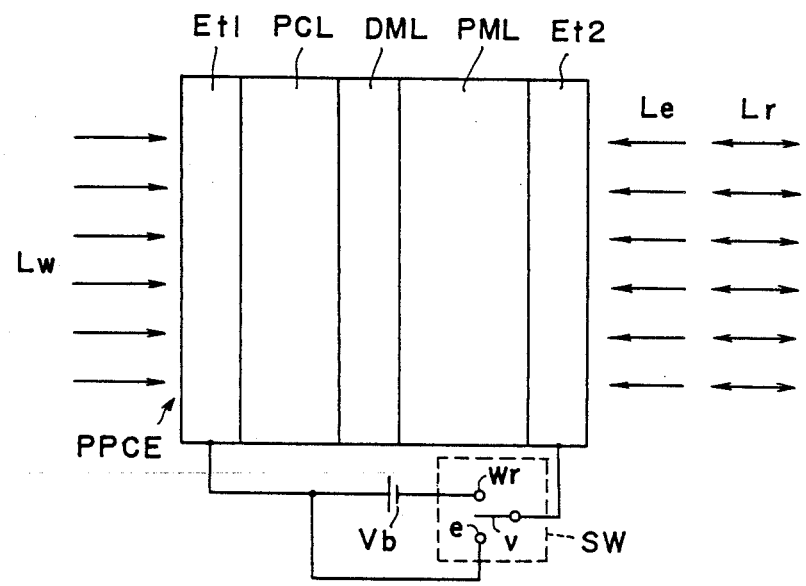
FIG. 23 is a side elevational view used for explaining the structure of the: photo-photo conversion element used with the image pickup apparatus of the invention.
Figure 24:
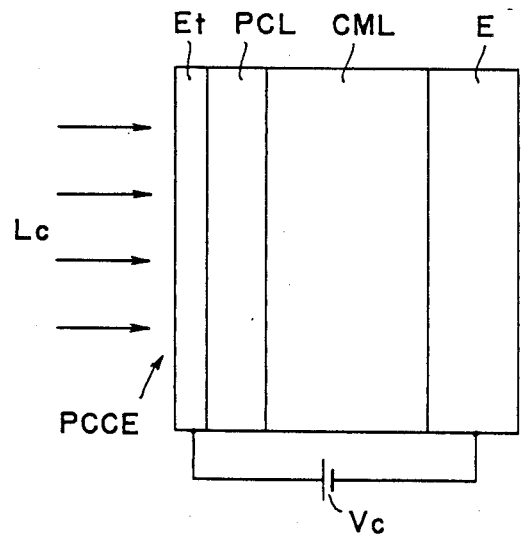
FIG. 24 is a side elevational view used for explaining the structure of the photo-charge conversion element used with the image pickup apparatus of the invention.

FIGS. 20 to 22 are schematic block diagrams showing embodiments of the image pickup apparatus of the invention, FIG. 23 is a side elevational view used for explaining the principle of the photo-photo conversion element of the image pickup apparatus, and FIG. 24 is a side elevational view used for explaining the principle of the photo-charge conversion element of the image pickup apparatus.

In the image pickup apparatus shown in FIG. 20, reference character O represents an object, reference numeral 201 represents a taking lens, 202 a shutter for the apparatus used as a still camera, PPCE a photo-photo conversion element, 204 a beam splitter, and 205 a light source for generating a reading light of mono-wavelength in reading an optical image from the photo-photo conversion element PPCE. For the light source 205, a laser light source or other suitable sources may be used.

Reference numerals 206 and 209 represent lenses, 207 a polarizer (if the light source can generate a light of mono-wavelength, the polarizer 207 is not needed), 208 an analyzer, and PCCE a photo-charge conversion element.

In the image pickup apparatus shown in FIG. 20, an optical image of the object O is focussed on the photo-photo conversion element PPCE through the taking lens 201. If the image pickup apparatus is used as a still camera, it is needless to say that the optical image of the object O is focussed on the photo-photo conversion element PPCE through the taking lens 201 while the shutter 202 is opened.

The photo-photo conversion element PPCE may use, for example, a liquid crystal type light modulator, a photoconductive Pockels effect element, a special modulation element such as a micro channel spatial light modulator, or an electrochromic element. The photo-photo conversion element PPCE may be of type having either a memory function or not, which is selectively used in accordance with a desired application.

FIG. 23 is a side elevational view used for explaining the principle of the photo-photo conversion element PPCE. In the FIG., Et1 and Et2 represent transparent electrodes, PCL a photoconductive layer, DML a dielectric mirror (having a wavelength selection characteristic transmitting writing and erasing light beams and reflecting a reading light beam), PML a photo-modulation layer made of such as a monocrystal of lithium niobate, Lw a writing light beam, Lr a reading light beam, Le an erasing light beam, Vb a power source, and SW a switch. During application of the writing light beam Lw and reading light beam Lr to the photo-photo conversion element PPCE, the movable contact v of the switch SW is switched to the fixed contact wr, whereas during application of the erasing light beam Le to the photo-photo conversion element PPCE, the movable contact v is switched to the fixed contact e.

With a voltage from the power source Vb being applied across the transparent electrodes Et1 and Et2 of the photo-photo conversion element PPCE via the movable contact v and fixed contact wr of the switch SW, and with the writing light beam Lw corresponding to the optical image of the object being applied to the photoconductive layer PCL via the transparent electrode Et1, the resistance of the photoconductive layer PCL changes with an intensity of the optical image of the object incident thereto.

An electric charge image corresponding to the optical image of the object is accordingly formed at the interface between the photoconductive layer PCL and dielectric mirror DML. The electric charge image can be erased upon application of the erasing light beam Le from the transparent electrode Et2 with the transparent electrodes Et1 and Et2 being shorted via the movable contact v and fixed contact e of the switch SW.

Specifically, in the erase mode, the erasing light beam Le is projected from the transparent electrode Et2 to the photo-modulation layer PML and dielectric mirror DML (having a wavelength selection characteristic passing the writing and erasing light beams and reflecting the reading light beam) and further into the photoconductive layer PCL which then lowers the resistance to erase the electric charge image at the interface between the photoconductive layer PCL and dielectric mirror DML.

The electric charge image corresponding to the optical image of the object and formed at the interface can be read as an optical image through the transparent electrode Et2 by projecting the reading light beam Lr toward the transparent electrode Et2, with the voltage from the power source Vb being applied across the transparent electrodes Et1 and Et2 via the movable contact v and fixed contact wr of the switch SW.

Specifically, in the read mode, the reading light beam Lr is applied through the transparent electrode Et2 to the photo-modulation layer PML and further to the dielectric mirror DML (having the wavelength selection characteristic passing the writing and erasing light beams and reflecting the reading light beam). The reading light beam Lr reflected by the dielectric mirror DML again passes through a body of the photo-modulation layer PML and is outputted from the transparent electrode Et2. As described previously, the outputted reading light has the polarization plane changed or modulated correspondingly with the electric charge image. Therefore, by passing the outputted light through an analyzer, it is possible to obtain an optical image the same as that of the object.

It is thus possible to reproduce the optical image of the object at high resolution by using a mono-wavelength light as the reading light beam.

In the image pickup apparatus shown in FIG. 20, the writing light beam Lw corresponding to the optical image of the object 0 and applied to the transparent electrode Et1 of the photo-photo conversion element PPCE via the taking lens 201, is transformed into an electric charge image at the interface between the photoconductive layer PCL and dielectric mirror DML. Using a mono-wavelength light as the reading light beam, the charge image can be outputted from the photo-photo conversion element PPCE as mono-wavelength optical information corresponding to the optical image of the object. The mono-wavelength reading light beam Lr is applied to the photo-photo conversion element PPCE, in the example shown in FIG. 20, via the optical path of light source 205, lens 206, polarizer 207, beam splitter 204, and transparent electrode Et2.

The mono-wavelength optical information corresponding to the optical information of the object and outputted from the photo-photo conversion element PPCE is focussed on the photo-charge conversion element PCCE, via the optical path of beam splitter 204, analyzer 208, and lens 209 (which may be employed on an optical reduction system).

FIG. 24 is a side elevational view showing an example of the structure of the photo-charge conversion element PCCE which is of a laminated structure constructed of a transparent electrode Et, photoconductive layer PCL, charge memory layer CML and electrode E. The charge memory layer CML may use a material having a sufficiently high insulating resistance for holding the charge image for a long period of time, such as silicon resin, polyester or the like.

Referring again to FIG. 24, with the power source Vc being connected between the transparent electrode Et and electrode E of the photo-charge conversion element PCCE, and with the writing light beam Lc being applied to the transparent electrode Et, the resistance of the photoconductive layer PCL changes with the light intensity distribution of the writing light beam Lc so that an electric charge image holding an amount of charge at each point thereof changed with the light intensity there at is formed at the interface between the photoconductive layer PCL and charge memory layer CML. The electric charge image can be erased upon application of the erasing light beam through the transparent electrode Et with both the electrodes being shorted.

The photo-charge conversion element PCCE may be a material arranged to be moved with respect to a writing unit in a predetermined manner by a transportation mechanism (not shown). In particular, in the case where the image pickup apparatus is used as a still camera, the photo-charge conversion element PCCE is moved by one frame (i.e., corresponding to one image) after the shutter 202 had been opened for a predetermined period and was closed. Alternatively, in the case where the image pickup apparatus is used as a moving image taking camera, the photo-charge conversion element PCCE is intermittently and incrementally moved at high speed frame by frame (corresponding to one image) in synchronization with the shutter being closed. Such intermittent and incremental transportation mechanism may be any one of known mechanisms. The photo-charge conversion element PCCE shown in FIG. 20 may be a tape type, disk type, sheet type or any other type.

The image pickup apparatus shown in FIG. 20 may be provided with an instrument having a signal processing function, a photoelectric conversion function or the like. For example, mono-wavelength optical information outputted from the photo-photo conversion element PPCE shown in FIG. 20 may be supplied to a signal processing unit via another half prism (not shown) following the beam splitter 204. Thus, the optical image information can be processed by the signal processing unit in various manners such as editing, trimming, light-amplification and the like. The signal processing unit may comprise controllable spatial light modulation elements and other devices of read and write memory, controlled coupling or functioning which devices allow parallel or simultaneous processing of optical signal elements collectively corresponding to the two dimensional optical information outputted from the photo-photo conversion element PPCE.

With the arrangement of the image pickup apparatus shown in FIG. 21, mono-wavelength optical information outputted from the photo-photo conversion element PPCE is applied to the photoelectric converter 216 via another beam splitter 214 following the beam splitter 204 to obtain an electric signal therefrom in the predetermined signal mode. The photoelectric converter 216 may be an area sensor, linear sensor, photo diodes, or the like, which are selectively used in accordance with a desired application. In the figure, reference numeral 210 represents a laser source for generating a reading light beam, 211 a laser source for generating an erasing light beam, 212 a beam splitter, 213 a wave plate for providing an optical bias, 214 a beam splitter, 215 a lens, and 216 a photoelectric converter.

The image pickup apparatus shown in FIG. 21 may be modified to have a monitor function for an optical image to be recorded on the photo-charge conversion element PPCE by directing the beam of optical image information reflected by the beam splitter 214 onto the a projection screen for monitoring.

FIG. 22 is a block diagram showing another embodiment of this invention wherein optical image information for the photo-charge conversion element PCCE is recorded and reproduced through a holography method. In the figure, reference character 0 represents an object, 201 a taking lens, 202 a shutter for the image pickup apparatus which is used as a still camera, PPCE a photo-photo conversion element, 218 a lens, and PCCE a photo-charge conversion element.

In the image pickup apparatus shown in FIG. 22, an optical image of the object 0 is focussed on the photo-photo conversion element PPCE through the taking lens 201. If the image pickup apparatus is used as a still camera, it is needless to say that the optical image of the object 0 is focussed on the photo-photo conversion element PPCE through the taking lens 201 while the shutter 202 is opened.

A light source 219 is used for generating a beam of light for reading the optical image from the photo-photo conversion element PPCE, and the beam also serves an interference light for recording a holographic image of the optical image on the photo-charge conversion element PCCE and for reading out the recorded holographic. The light source 219 may be a semiconductor laser for example.

The light beam is projected to the photo-photo conversion element PPCE, via the optical path from the light source 219, beam splitter 220 and concave lens 222. An optical image corresponding to the object is accordingly read out from the photo-photo conversion element PPCE and focussed on the photo-charge conversion element PCCE by the lens 218 upon projection of a light beam from the light source 219. Since the interference light beam is splitted by the beam splitter 220 and advances to the photo-charge conversion element PCCE, via the optical path from the beam splitter 220, and concave lens 221, the optical image of the object read out from the photo-photo conversion element PPCE is formed on the photo-charge conversion element IPCE as a hologram.

The photo-charge conversion element PCCE may be a material arranged to be moved with respect to the optical components in a predetermined manner by a transportation mechanism (not shown). In particular, in the case where the image pickup apparatus shown in FIG. 22 is used as a still camera, the photo-charge conversion element PCCE is moved by one frame (i.e., corresponding to one image) after the shutter 202 had been opened for a predetermined period and was closed. Alternatively, in the case where the image pickup apparatus is used as a moving image taking camera, the photo-charge conversion element PCCE is intermittently and incrementally moved at high speed frame by frame (corresponding to one image) in synchronization with the shutter being closed. Such intermittent and incremental transportation mechanism may be any one of known mechanisms.

In the embodiment image pickup apparatus shown in FIGS. 20 to 22, the information stored in the form of an electric charge image in the photo-charge conversion element PCCE may be read electrostatically by positioning a needle electrode or a multi-needle electrode close to the transparent electrode Et of the photo-charge conversion element PCCE so as to scan the image, with the transparent electrode Et and electrode E being shorted. Alternatively, with the electrodes Et and E being shorted and with the dielectric mirror of the reading head such as shown in FIG. 8 being positioned close to the transparent electrode Et, the reading light beam is applied through the transparent electrode of the reading head to the photo-modulation layer, and to the dielectric mirror. The reflected reading light beam at the dielectric mirror is then outputted through the transparent electrode and is directed to the analyzer to reproduce an optical image information in the same manner explained in the foregoing. The optical image information obtained as above may be converted into an electric signal of high resolution information.

If the image pickup apparatus of the above embodiments is to be used as a color image pickup apparatus, an optical color separation stripe filter of a known structure is disposed in front of the transparent electrode Et1 of the photo-photo conversion element PPCE.

Figure 25:
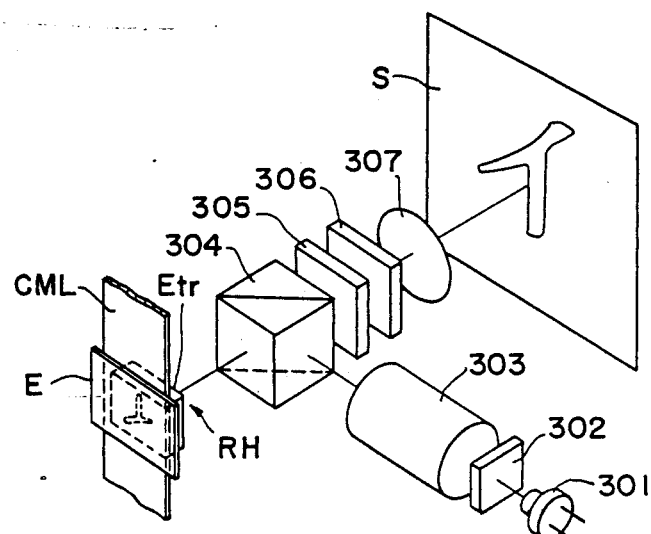
FIG. 25 is a schematic block diagram showing an embodiment of a display device of this invention.
Figure 26:
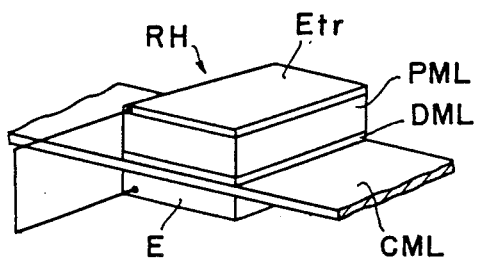
FIGS. 26 and 27 are perspective views used for explaining the recording medium on which information to be displayed on the display device is recorded, and the charge image reading head for reading the information from the recording medium.
Figure 27:
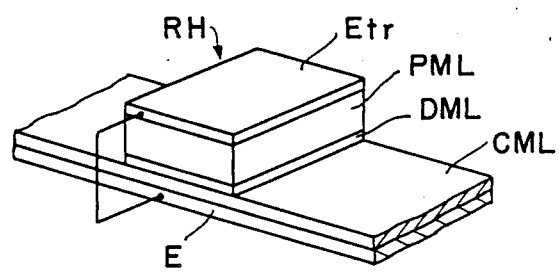

FIG. 25 is a block diagram showing an embodiment of a display device of this invention, and FIGS. 26 and 27 are perspective views used for explaining a recording medium on which charge images to be displayed on the display device are formed, and a charge image reading head for reading the information from the recording medium.

In FIG. 25, reference numeral 301 represents a laser source (or halogen lamp), 302 a polarizer, 303 a beam expander, 304 a beam splitter, 305 a wave plate, 306 an analyzer, S a screen, a recording medium comprising a charge memory layer CML explained before which is capable of recording information in the form of charge images, and RH a charge image reading head.

First, referring to FIGS. 26 and 27, structures of the two charge image reading head in relation to the respective recording media usable in the embodiment of FIG. 25 will be described. The reading head RH and the recording medium shown in FIG. 26 are same reading head RH and the charge memory layer CML used in the embodiment shown in FIG. 3, therefore explanation of their functions are omitted.

In FIG. 27 an electrode E contacts the recording medium at the surface opposite to the one on which an electric charge image is formed. The recording medium CML shown in FIG. 27 comprises a charge memory layer CML which is a material such as silicone resin having a high insulating resistance which allows to hold an electric charge image on the surface of the recording medium for a long period of time and a layer of electrode laminated to the charge memory layer CML.

The reading head RH and recording medium may be arranged in the relation shown in FIG. 27 wherein the charge memory layer CML faces the reading head RH at the surface opposite to the surface of the electrode E.

The dielectric mirror DML has a laminated structure, for example, of alternately stacked two materials having a different refractive index as each other but the same thickness of a quarter of light wavelength. The material having a higher refractive index may be $TiO_2$, and that having a lower refractive index may use $SiO_2$. These materials are stacked up to a total of ten layers for example. With such structure, it is possible to provide a dielectric mirror having a high refractive index and high electrical impedance.

The recording medium in FIG. 25 may be of a disk type, tape type, sheet type or any other types.

The charge image reading head RH converts the electric charge image into an optical image, and is constructed of the dielectric mirror DML, photo-modulation layer PML, and transparent electrode Etr laminated in this order. The photo-modulation layer PML is made of a material such as lithium niobate having an electro-optical effect, or a nematic liquid crystal having an electric field scattering effect, the material changing the optical characteristic or mode to the light inputted thereto in accordance with an electric field applied thereto. Therefore, the light beam projected to the reading head RH undergoes the same effect as explained in the foregoing.

Specifically in FIG. 25, a light beam projected from the laser light source 301 (or halogen lamp 301) is applied to the light polarizer 303 to make it a linearly polarized light which is applied to the beam expander 302. If the light source 301 is a linearly polarized laser light source, then the light polarizer 302 is not needed.

The beam expander 303 expands the light beam incident thereto and outputs to the beam splitter 304.

The beam expander 3 has a function to make the cross sectional area of a projection light beam sufficiently large for covering to the whole surface of the reading head RH.

The light from the beam splitter 304 is applied to the charge reading head RH. The charge image reading head RH has a function to transform an electric charge image on the recording medium into corresponding optical information. Since the electric charge image is being applied from the recording medium to the dielectric mirror DML, an electric field is being applied to the photo-modulation layer PML to change characteristics thereof.

The output light from the charge image reading head RH is a light whose polarization plane is rotated by the amount corresponding to the charge quantity of the charge image on the recording medium.

The output light from the charge image reading head RH is applied to the analyzer 306 via the beam splitter 304 and wave plate 305 for optical bias setting, then to the converging lens 307 as the light whose intensity is being modulated due to the analyzer 306 so as to correspond to the charge quantity of the charge image. Then, the converged light is projected onto the screen S.

Displayed accordingly on the screen S is an image of high fidelity corresponding to the electric charge image recorded on the recording medium.

In the embodiment shown in FIG. 25, a laser beam projected from the laser source 301 is expanded by the beam expander 303 to read the charge image on the recording medium two dimensionally at a time. However, instead of the beam expander 303, a light deflector capable of deflecting the light beam in the horizontal and vertical directions may be used to read the charge image on the recording medium progressively in a form of scanned raster.

What is claimed is:

1. An image pickup apparatus comprising:
   a movable charge storage member;
   a photo-charge conversion unit comprising a photoconductive layer member having a transparent electrode, an electrode, and means for applying an electric field between said transparent electrode and said electrode, said photo-charge conversion unit opposing said charge storage member; and
   means for focussing an optical image of an object through said transparent electrode onto an image focussing surface of said photo-charge conversion unit via a taking lens, and for forming an electric charge image corresponding to said optical image of the object on said charge storage member.

2. An image pickup apparatus according to claim 1 further comprising;
   means for displacing said charge storage member with respect to said photo-charge conversion unit, said photoconductive layer and said electrode of which are arranged on opposing sides of said charge storage member.

3. An image pickup apparatus according to claim 1 further comprising;
   reading means for reading said electric charge image corresponding to said optical image and generating an electrical signal according to said electric charge image by opposing said charge storage member.

4. An image pickup apparatus according to claim 3 further comprising;
   moving means for moving said charge storage member from said photo-charge conversion unit to said reading means so that said electric charge image formed by said focussing means is transported to said reading means and is converted into said electrical signal.

5. An image pickup apparatus according to claim 1, wherein said charge storage member is a disk.

6. An image pickup apparatus according to claim 2, wherein said charge storage member is a sheet and said displacing means displaces said sheet direction parallel to said sheet, displaces said sheet.

* * * * *